(12) United States Patent
Ikeda

(10) Patent No.: US 8,081,613 B2
(45) Date of Patent: Dec. 20, 2011

(54) WIRELESS COMMUNICATION SYSTEM AND WIRELESS COMMUNICATION APPARATUS AND CONTROL METHOD THEREOF

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/247,361

(22) Filed: Oct. 8, 2008

(65) Prior Publication Data

US 2009/0103502 A1 Apr. 23, 2009

(30) Foreign Application Priority Data

Oct. 18, 2007 (JP) .................................. 2007-271780

(51) Int. Cl.
*H04W 4/00* (2009.01)
(52) U.S. Cl. ........................................................ 370/338
(58) Field of Classification Search ........................ None
See application file for complete search history.

(56) References Cited

U.S. PATENT DOCUMENTS

| | | | |
|---|---|---|---|
| 6,493,759 B1 * | 12/2002 | Passman et al. | 455/446 |
| 6,894,992 B1 | 5/2005 | Morvan et al. | |
| 7,774,028 B1 * | 8/2010 | Pfister et al. | 455/566 |
| 2006/0073832 A1 * | 4/2006 | Pfister | 455/446 |
| 2007/0066273 A1 * | 3/2007 | Laroia et al. | 455/343.2 |
| 2008/0298275 A1 * | 12/2008 | De Sousa | 370/255 |

FOREIGN PATENT DOCUMENTS

JP 2000-082990 3/2000

* cited by examiner

*Primary Examiner* — Anh-Vu Ly
(74) *Attorney, Agent, or Firm* — Cowan, Liebowwitz & Latman, P.C.

(57) ABSTRACT

A display apparatus selects one of multiple wireless communication apparatuses and activates the selected wireless communication apparatus as a second access point of a second group. The activated wireless communication apparatus establishes the second group including multiple wireless communication apparatuses. After the second group is thus established, the transmission power of the wireless communication apparatus activated as the access point and the multiple wireless communication apparatuses included in the second group is controlled.

27 Claims, 18 Drawing Sheets

F I G. 10
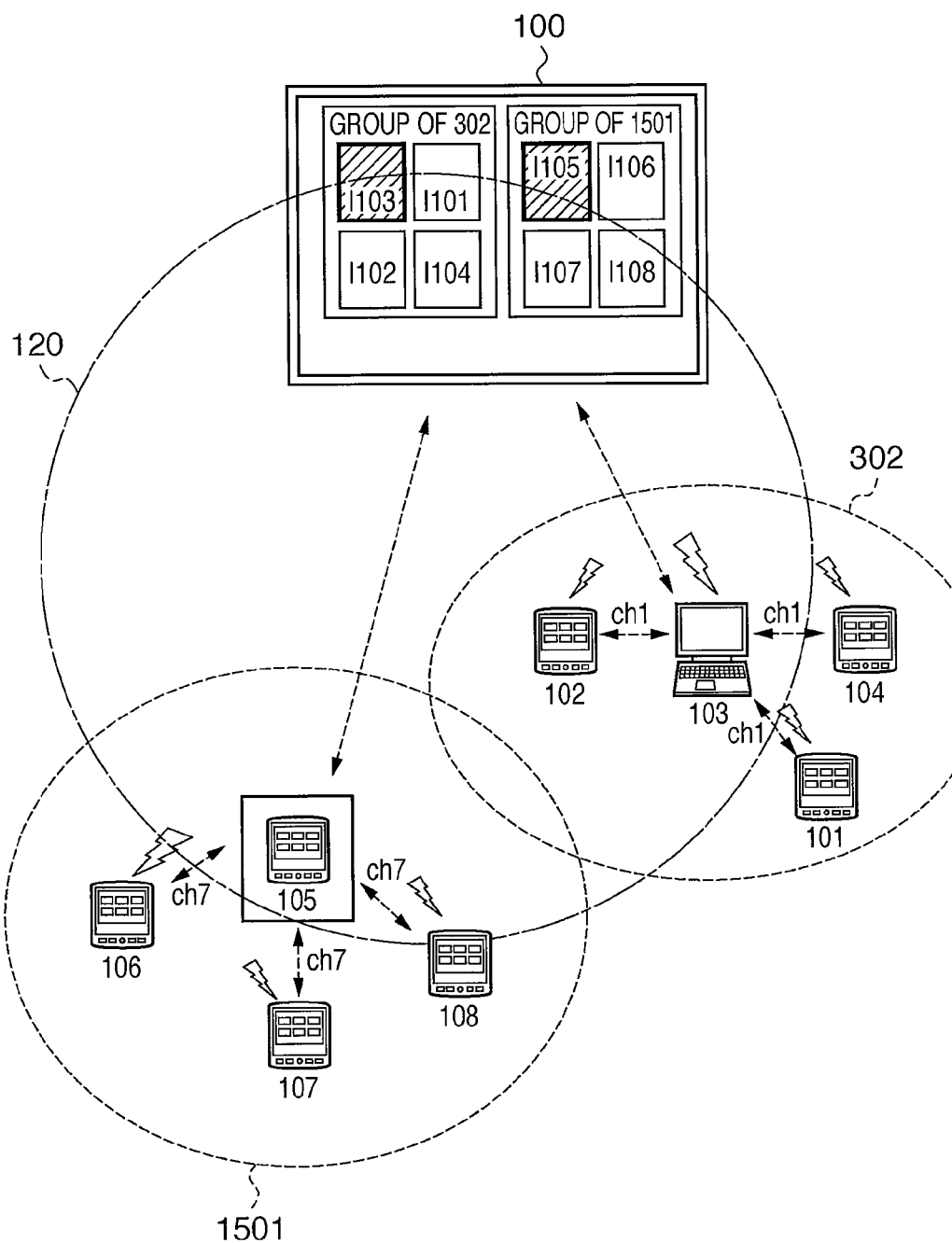

WIRELESS COMMUNICATION SYSTEM AND WIRELESS COMMUNICATION APPARATUS AND CONTROL METHOD THEREOF

BACKGROUND OF THE INVENTION

1. Field of the Invention

The present invention relates to a wireless communication system and a wireless communication apparatus that establishes a wireless communication network with other wireless communication apparatuses through a wireless access point apparatus, and a control method for controlling the wireless communication apparatus.

2. Description of the Related Art

Products conforming to IEEE 802.11 standards, which are standards for wireless local area networks, are widely used in these years. Configurations of wireless LANs are broadly classified into infrastructure mode and ad hoc mode. An infrastructure mode network includes multiple stations (STAs, terminal stations) and access points (AP, base stations). An ad-hoc mode network includes multiple STAs, and wireless communication apparatuses directly communicate with each other without using an access point.

Educational institutions such as schools and cram schools are increasingly actively using wireless LANS. One example is a wireless communication system including a display that has an access point function and multiple client terminals used by students, each of which has a station function. In the wireless communication system, information of client terminals wirelessly connected with the display can be displayed on the screen of the display. A teacher or instructor operating the display can perform operations to identify students, establish groups, or divide students into groups through the wireless LAN while conducing classes or delivering a lecture.

An example of grouping is described in Japanese Patent Laid-Open No. 2000-82990 in which one of arbitrary two mobile stations belonging to a cell functions as a secondary base station to form a new cell, thus dividing one cell into several cells.

However, the wireless communication system described above has the following problems:

(1) If many students access the teacher at a time in order to ask questions without arbitration, contention for a radio band occurs, which significantly degrades the response time.

(2) The manner of operation for dynamically dividing students into arbitrary groups according to a subject and time is cumbersome and complicated.

(3) Once students are divided into groups, the groups use their individual wireless channels. Therefore, radio interference occurs between neighboring groups.

SUMMARY OF THE INVENTION

An object of the present invention is to eliminate the problems with existing techniques.

A feature of one aspect of the present invention is to facilitate grouping of wireless communication terminal stations in a wireless communication system and to prevent communication interference between the groups.

According to an aspect of the present invention, there is provided a wireless communication system including a plurality of wireless communication apparatuses supporting an access point mode and a station mode and a first access point apparatus of a first group including multiple wireless communication apparatuses, the system comprising:

a unit configured to cause the first access point apparatus to select one of the plurality of wireless communication apparatuses and activate the selected wireless communication apparatus as a second access point apparatus of a second group;

a unit configured to establish the second group including the second access point apparatus and multiple wireless communication apparatuses by the second access point apparatus; and a transmission power control unit configured to control the transmission power of the second access point apparatus and the multiple wireless communication apparatuses included in the second group after the second group is established.

According to an aspect of the present invention, there is provided a control method for controlling a wireless communication system including a plurality of wireless communication apparatuses supporting an access point mode and a station mode and a first access point apparatus of a first group including the plurality of wireless communication apparatuses, the method comprising the steps of:

causing the first access point apparatus to select one of the plurality of wireless communication apparatuses and activate the selected wireless communication apparatus as a second access point apparatus of a second group;

establishing, by the wireless communication apparatus activated as the second access point apparatus, the second group including the second access point apparatus and multiple wireless communication apparatuses in accordance with an instruction from the first access point apparatus; and controlling the transmission power of the second access point apparatus and the multiple wireless communication apparatuses included in the second group after the second group is established.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 depicts a view illustrating an example of a network configuration of the wireless communication system following the configuration in FIG. 9 according to the third exemplary embodiment.

DESCRIPTION OF THE EMBODIMENTS

Exemplary embodiments of the present invention will be described in detail below with reference to the accompanying drawings. The exemplary embodiments described below are not intended to limit the scope of the present invention which is defined by the claims, and not all of the combinations of features described with respect to the present exemplary embodiments are essential to the solution according to the present invention.

Figure 1:
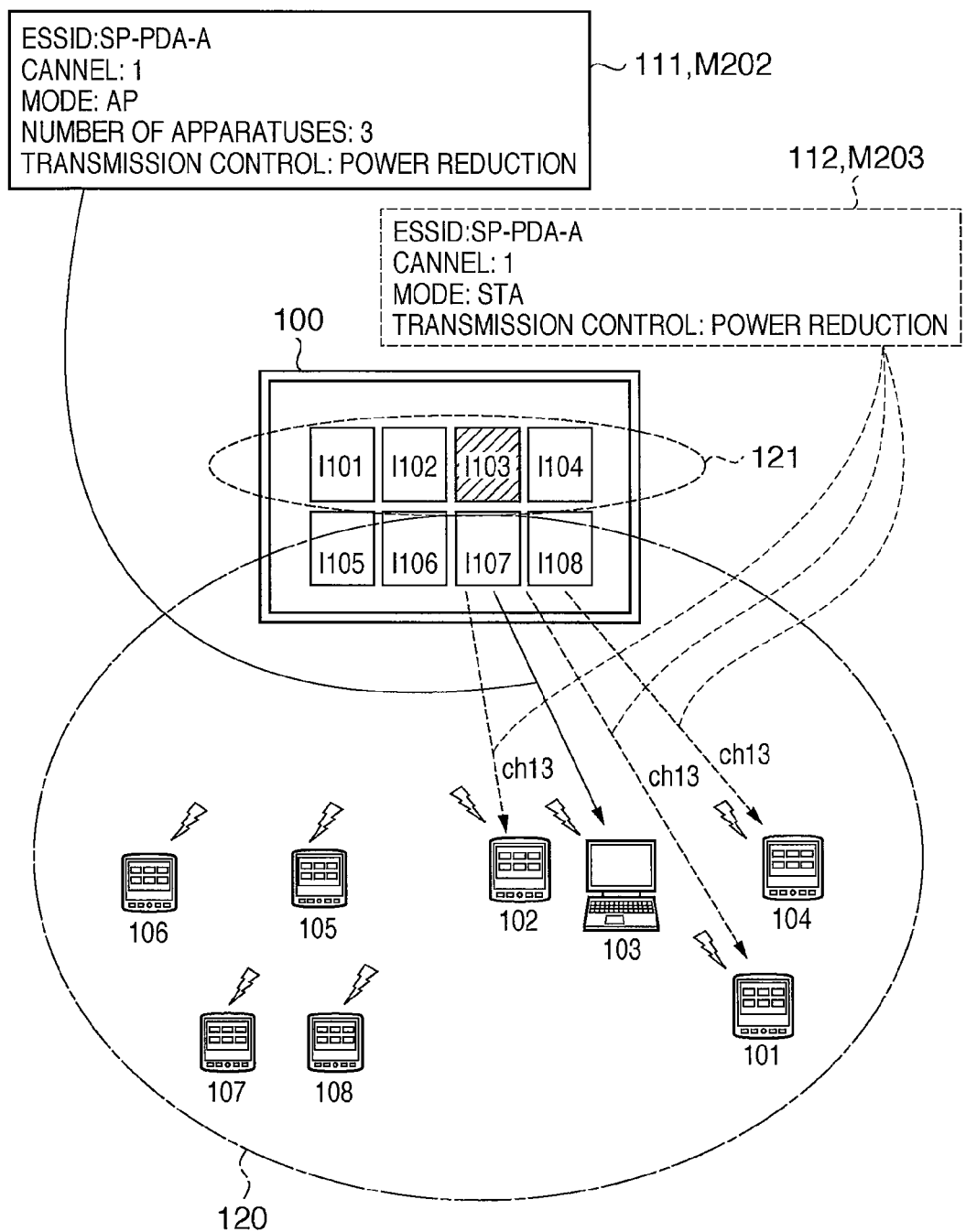
FIG. 1 depicts a view illustrating an example of a wireless communication system according to an exemplary embodiment of the present invention.

FIG. 1 depicts a view illustrating an example of a wireless communication system according to an exemplary embodiment of the present invention.

In FIG. 1, reference numeral 100 denotes a display apparatus having an access point function operating as a first access point of the wireless communication system. Icons of wireless communication apparatuses joined in a wireless network of the wireless communication system are displayed on a display screen of the display apparatus 100. Symbols I101 to I108 shown in the display screen represent the icons associated with wireless communication apparatuses 101 to 108, which will be described later, included in the wireless communication system. These icons are randomly arranged and displayed because the wireless communication apparatuses are not yet grouped because the state in FIG. 1 is the initial state immediately after the start-up of the system. Each of the wireless communication apparatuses 101 to 108 has AP and STA functions and supports access point mode (AP mode) and station mode (STA mode). Particularly, wireless communication apparatus 103 is a laptop personal computer that includes a wireless communication facility. Each of the wireless communication apparatuses 101 to 108 can operate both of the AP mode in which the wireless communication apparatus functions as an AP of the wireless LAN and the STA mode in which the wireless communication apparatus functions as a station (STA) at the same time, or can switch between the two modes and be activated in one of the modes. Box 111 shows details of a message sent from the display apparatus 100 to a wireless communication apparatus to be activated in the AP mode. Box 112 shows details of a message sent from the display apparatus 100 to wireless communication apparatuses to be activated in the STA mode. Reference numeral 120 denotes a wireless communication area that the display apparatus (first AP) 100 can control. Reference numeral 121 indicates a display of icons of wireless communication stations selected by grouping into a first group. Here, wireless communication apparatuses 101 to 104 are included in one group. The display apparatus 100 and wireless communication apparatuses 101, 102, and 104 communicate with one another through channel 13 (ch13) in FIG. 1.

Figure 2:
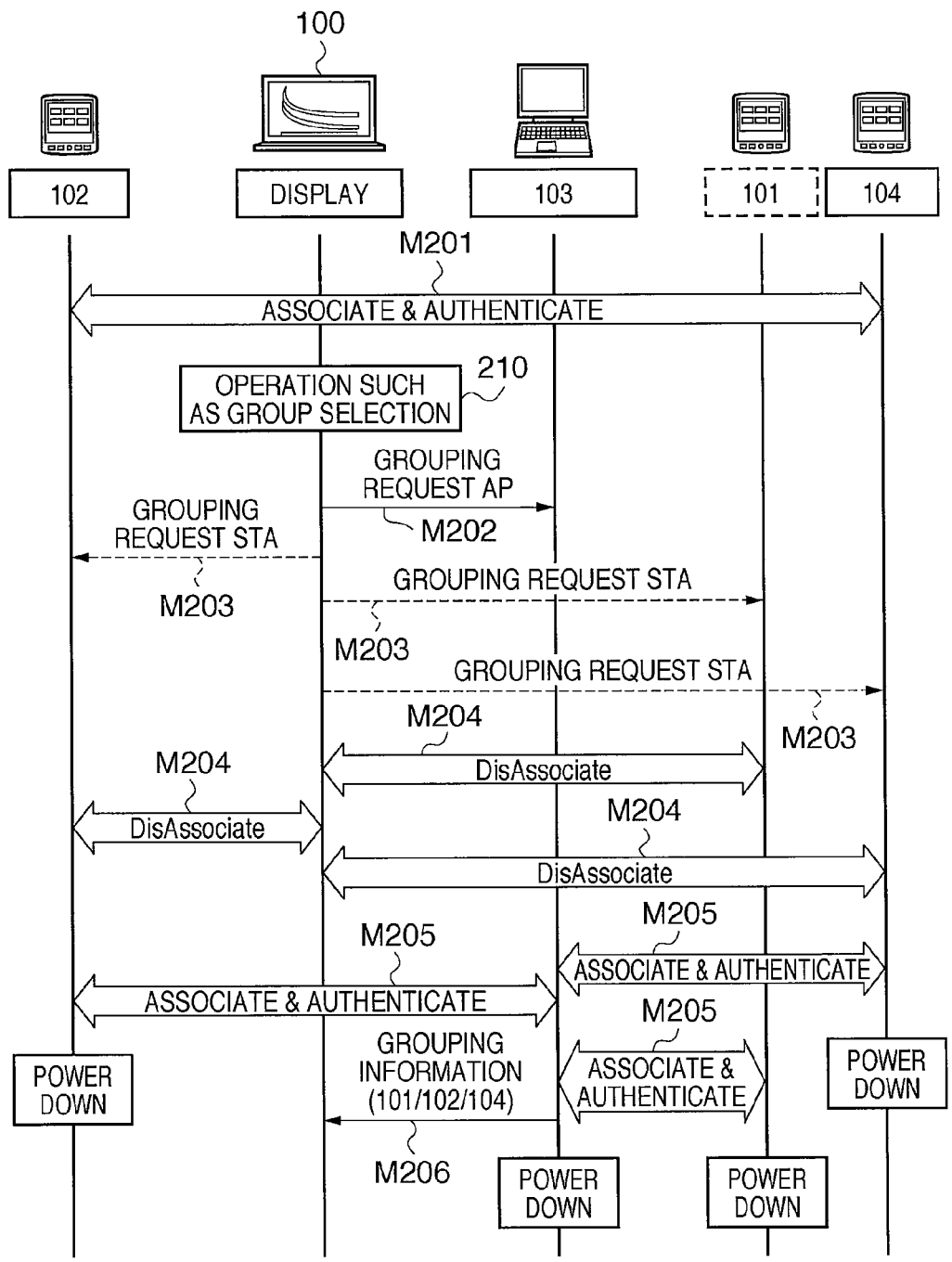
FIG. 2 is a sequence chart illustrating a process of sending and receiving messages among wireless terminal stations grouped in a wireless communication system according to a first exemplary embodiment of the present invention.

FIG. 2 is a sequence chart illustrating a process of sending and receiving messages among wireless stations 101-104 (in FIG. 1) grouped in a wireless communication system according to a first exemplary embodiment.

Figure 3:
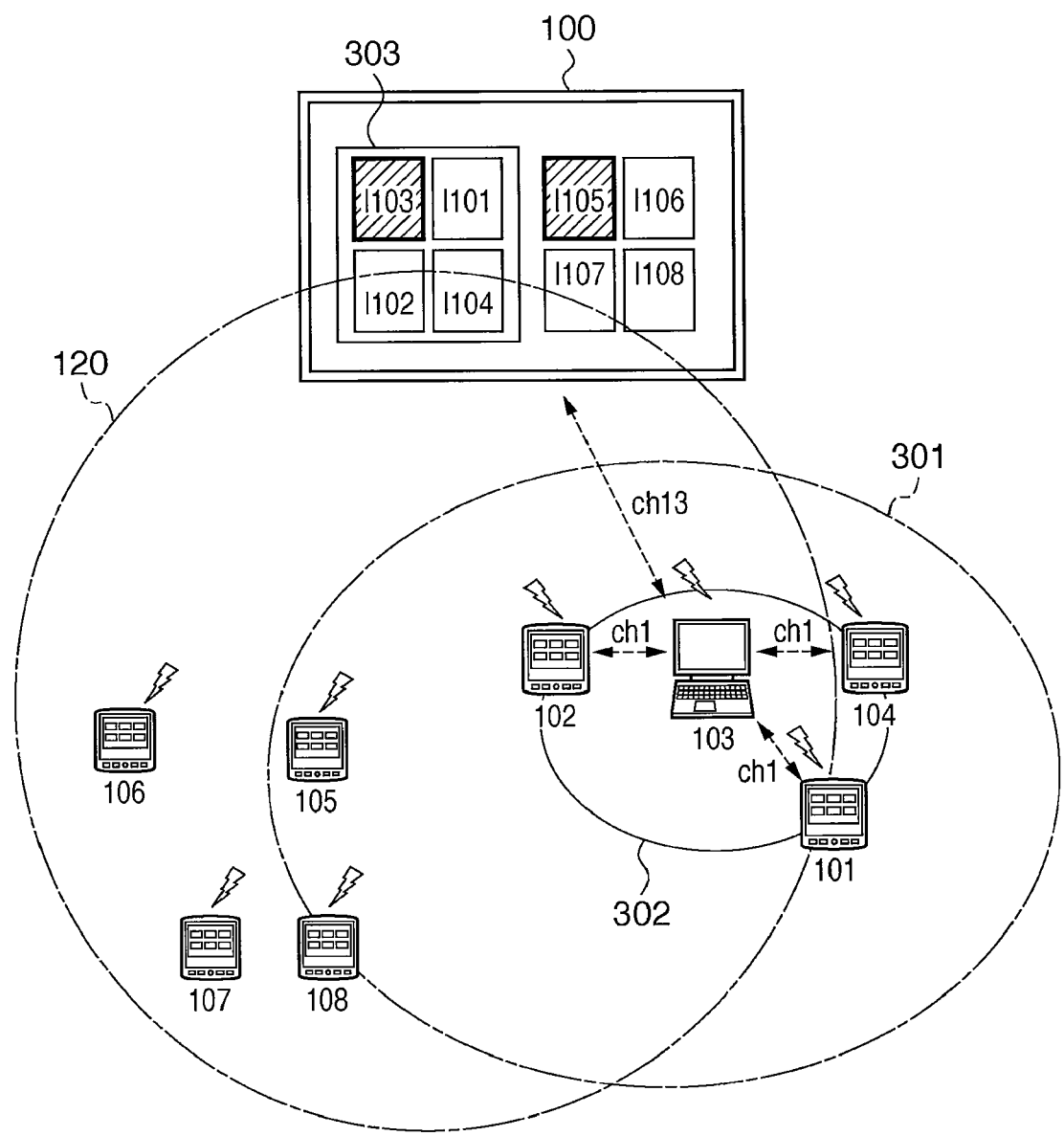
FIG. 3 depicts a view illustrating an example of a network configuration of the wireless communication system according to the first exemplary embodiment of the present invention.

FIG. 3 depicts a view illustrating an example of a network configuration of the wireless communication system according to the first exemplary embodiment. FIG. 3 shows a state of the system changed from the state in FIG. 1 by grouping.

In FIG. 3, a state of the wireless communication system after a first process is performed is displayed on the display screen of the display apparatus 100. Here, the display screen displays a state in which wireless communication apparatus 103 functions as a second access point and wireless communication apparatuses 101, 102, and 104 constitute a second group. Reference numeral 301 indicates a control area of the second group immediately after the formation of the second group and reference numeral 302 indicates a control area after transmission power reduction (transmission power control).

Before proceeding to the description of exemplary embodiments, a hardware configuration of the wireless communication apparatuses (101 to 108) and the display apparatus 100 according to the present exemplary embodiments will be described. It is assumed in the exemplary embodiments described below that the wireless communication apparatuses and the display apparatus 100 have a similar hardware configuration.

Figure 18:
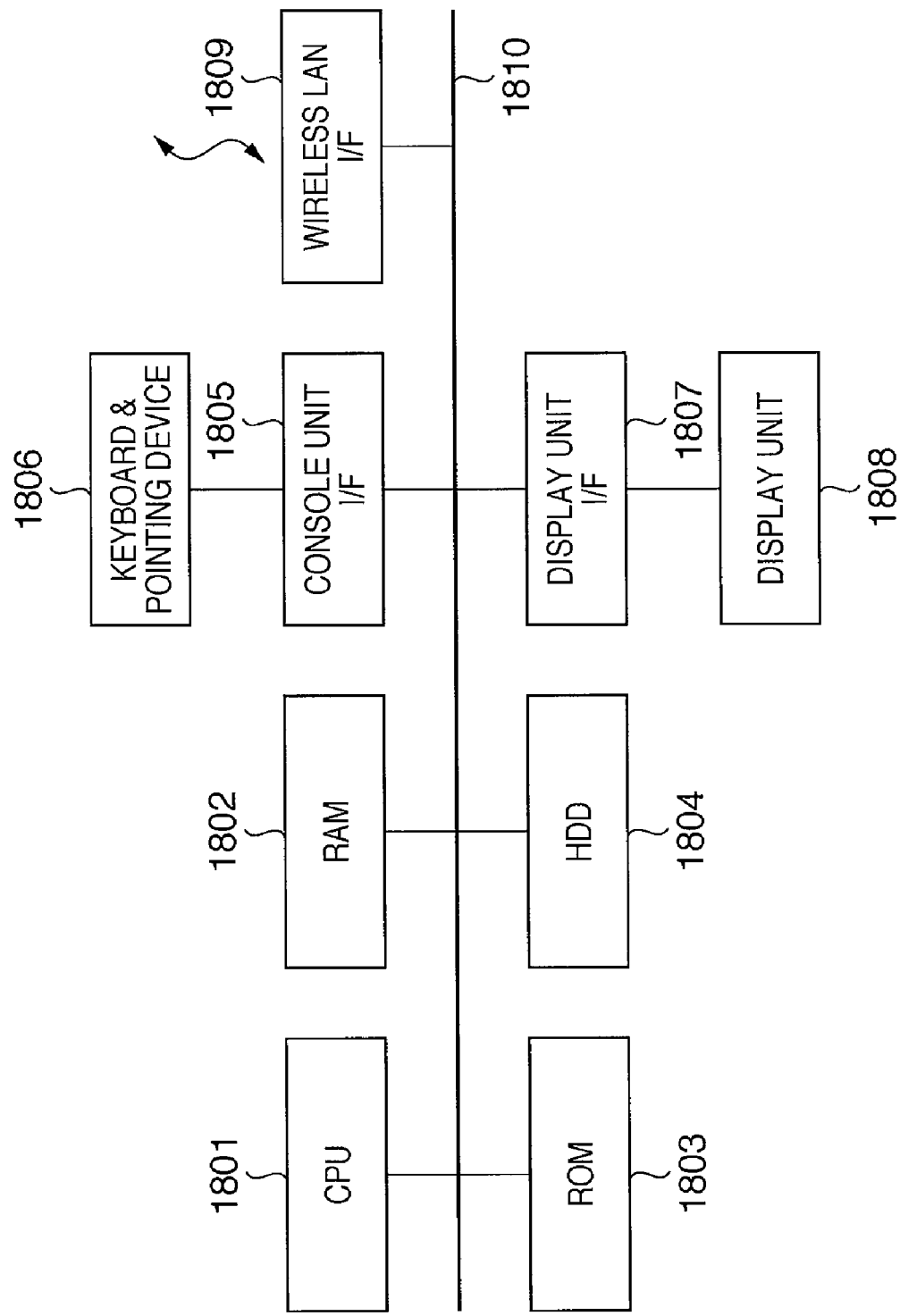
FIG. 18 is a block diagram illustrating a hardware configuration of a wireless communication apparatus and a display according to the present exemplary embodiments.

FIG. 18 is a block diagram illustrating a hardware configuration of a wireless communication apparatus and display apparatus according to the present exemplary embodiments.

A CPU 1801 performs processes, which will be described below, in accordance with a program stored in a RAM 1802 or a ROM 1803 to control operations of the wireless communication apparatuses or the display apparatus. An operating system, various kinds of applications, control programs, and other programs have been installed on a hard disk (HDD) 1804 beforehand. When an instruction to execute a process by the program is issued, the program is loaded into the RAM 1802 and is executed under the control of the CPU 1801. The RAM 1802 further provides a work area for storing various kinds of data during control processing by the CPU 1801. The ROM 1803 stores a boot program which is executed upon power-up of the apparatus. A console unit interface (I/F) 1805 controls interface with a console unit 1806 including a key-board and a pointing device such as a mouse. A display unit interface (I/F) 1807 controls a display unit 1808 to cause it to display an image and information such as messages to a user as instructed by the CPU 1801. Display by the display apparatus 100, which will be described later, is provided on the display unit 1808. A wireless LAN interface (I/F) 1809 wirelessly transmits and receives data. A system bus 1810 connects the components described above to the CPU 1801 and is used for exchanging control signals, addresses, and data and the like between them.

First Exemplary Embodiment

The wireless communication system according to the first exemplary embodiment of the present invention will be described with reference to FIGS. 1 to 4 and 8.

Figure 4:
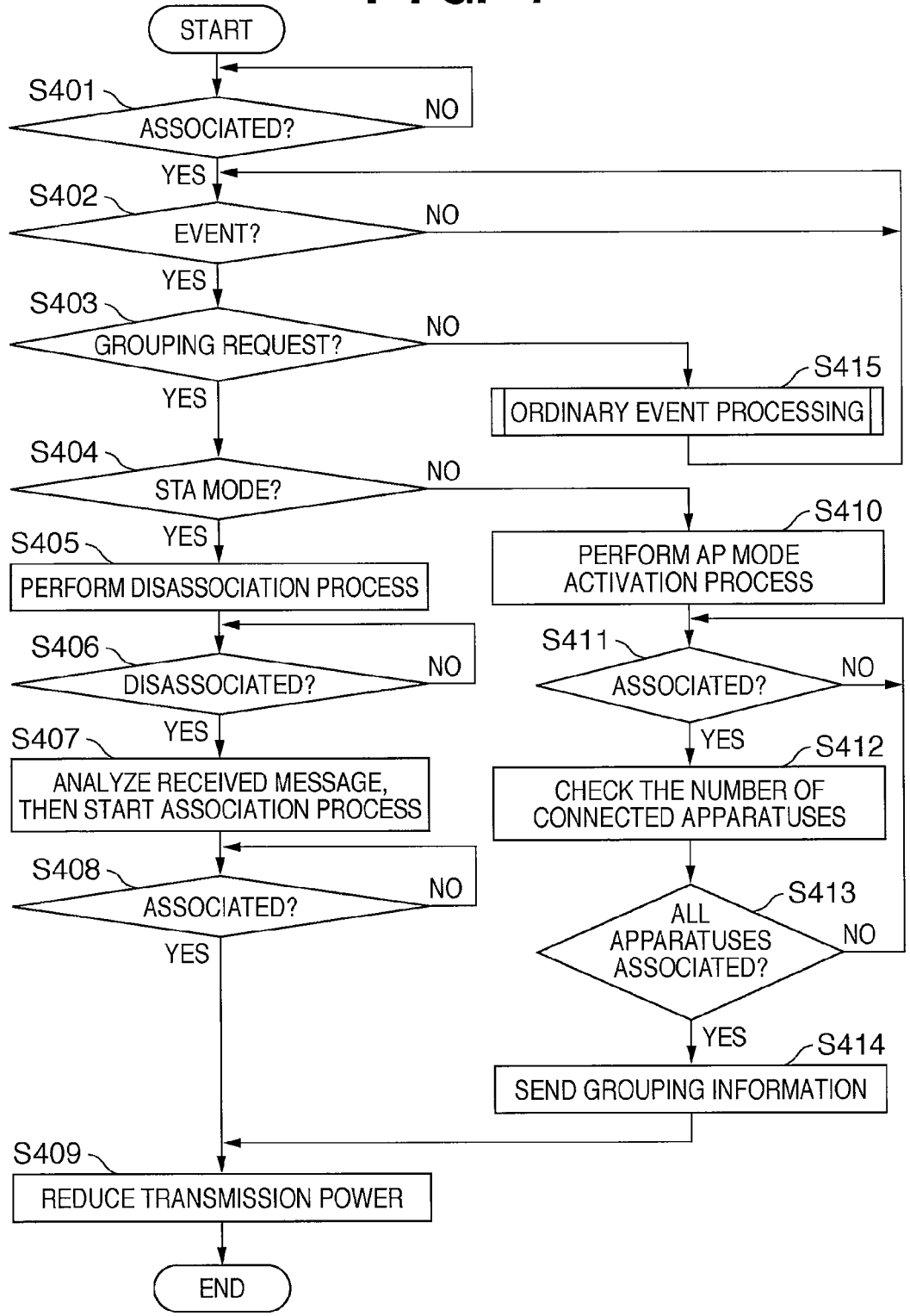
FIG. 4 is a flowchart explaining a control process performed by a wireless communication apparatus according to the first exemplary embodiment.
Figure 8:
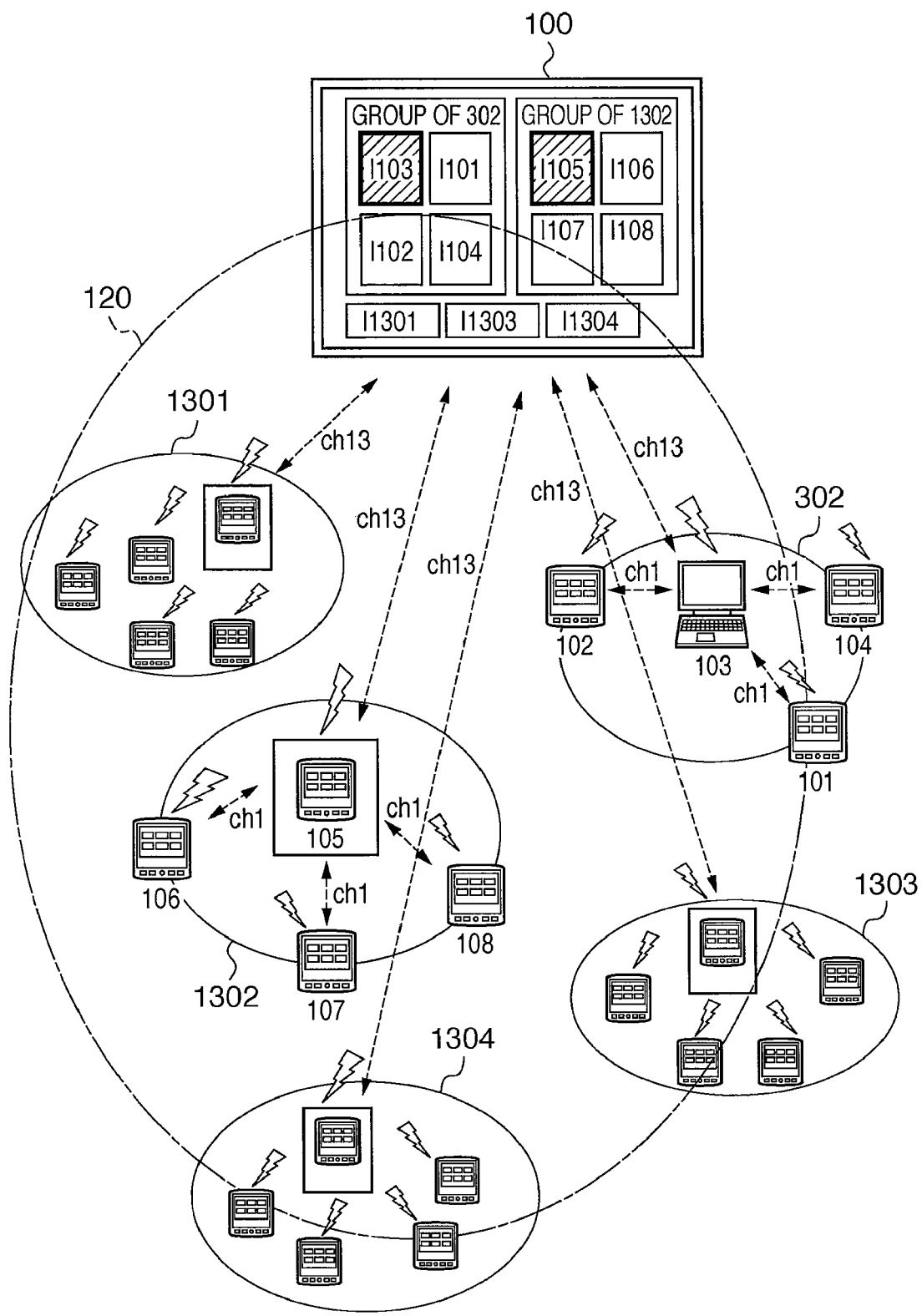
FIG. 8 depicts a view illustrating an example of a network configuration of the wireless communication system according to the first and second exemplary embodiments.

FIG. 4 is a flowchart explaining a control process performed by a wireless communication apparatus 101 to 108 according to the first exemplary embodiment. A program performing the process has been installed on the HDD 1804. When the program is to be executed, the program is loaded into the RAM 1802 and executed under the control of the CPU 1801. FIG. 8 shows a network configuration of the wireless communication system after grouping according to the first exemplary embodiment. The first exemplary embodiment of the present invention will be described with reference to these figures as appropriate.

In FIG. 1, the wireless communication apparatuses 101 to 108 operating in the STA mode have been associated and authenticated with the display apparatus 100, which has an AP function for wireless LAN (M201 in FIG. 2). A process of each of the wireless communication apparatuses 101 to 108 in this state proceeds from step S401 of FIG. 4, where it is determined whether the wireless communication apparatus has been associated and authenticated. The process proceeds to step S402, where each of the wireless communication apparatuses waits for occurrence of an event.

A user operates the console unit 1806 of the display apparatus 100 to instruct that wireless communication apparatus 103 should activate both in the STA and AP modes. Then, the user performs an operation for grouping the wireless communication apparatuses 101 to 104 into one group 121 (FIG. 1). The operation is indicated by a reference numeral 210 in FIG. 2. In response to the operation, the display apparatus 100 sends to the wireless communication apparatus 103 a grouping request message (M202 in FIG. 2) including information required for grouping (access point specification), which includes the following items (1) to (5) of information (111 in FIG. 1):

(1) ESSID (group identification information): "SP_PDA-A"

(2) Channel to be used (wireless channel used in the group): ch1 (medium information)

(3) Operation mode (specifies a mode to be activated in addition to STA mode): AP (4) The number of the communication apparatuses in the group (excluding the wireless communication apparatus 103): 3

(5) Transmission power control (controls transmission capability after grouping): Power reduction Upon reception of the grouping request message (M202) which specifies grouping, the wireless communication apparatus 103 recognizes the message as an event and the process proceeds from step S402 to step S403 of FIG. 4, where the wireless communication apparatus 103 determines whether the message is a grouping request. If the wireless communication apparatus 103 determines that the message is a grouping request, the process of the wireless communication apparatus 103 proceeds to step S404; otherwise, the process proceeds to step S415, where the wireless communication apparatus 103 executes a process for the event.

In this case, the wireless communication apparatus 103 determines that the event is a grouping request and the process proceeds to step S404, where the wireless communication apparatus 103 determines the designated operation mode (item (3) listed above). Here, because the AP mode is specified as the operation mode, the process of the wireless communication apparatus 103 proceeds from step S404 to S410 of FIG. 4. In step S410, the wireless communication apparatus 103 uses the ESSID in item (1) listed above and the information indicating the channel to be used in item (2) to start the AP mode while maintaining the association with the display apparatus 100 in the STA mode. Then the process of the wireless communication apparatus 103 proceeds to step S411, where the wireless communication apparatus 103 enters a wait state in which it waits for association with each of the wireless communication apparatuses 101, 102, and 104, based on the number of apparatuses in item (4). When association and authentication with one of the wireless communication apparatuses 101, 102, and 104 is completed (M205 in FIG. 2) in step S411, the process proceeds to step S412. In step S412, the wireless communication apparatus 103 compares the number of wireless communication apparatuses with which association and authentication have been completed with the number of apparatuses specified in item (4). The wireless communication apparatus 103 determines in step S413 whether association and authentication with the specified number of wireless communication apparatuses have been completed. If the specified number has not been reached, the process returns to step S411 and repeats the process described above. If the specified number has been reached, the process proceeds to step S414. In step 414, the wireless communication apparatus 103 sends grouping information (M206 in FIG. 2) including information about the grouped wireless communication apparatuses 101, 102, and 104 to the display apparatus 100. With this information, the display apparatus 100 recognizes the completion of grouping. The process of the wireless communication apparatus 103 then proceeds to step S409 and performs control to reduce transmission power according to the transmission power control information in item (5) listed above. As a result, an area controlled by the wireless communication apparatus 103 is reduced as indicated by numeral 302 in FIG. 3. In a control area 302 in FIG. 3, the wireless communication apparatuses 101 to 104 send and receive data to and from one another through channel 1 (ch1) and the wireless communication apparatus 103 and the display apparatus 100 send and receive data to and from each other through channel 13 (ch13).

On the other hand, upon reception of the grouping information (M206 in FIG. 2) from the wireless communication apparatus 103, the display apparatus 100 analyzes the grouping information. Then, the display apparatus 100 groups the icons of the wireless communication apparatuses 101 to 104 based on the result of the analysis and displays the grouped icons as shown by numeral 303 in FIG. 3. Here, the icon I103 of the wireless communication apparatus 103 is displayed in a manner that allows a user to identify the communication apparatus 103 as being in the AP mode (the icon I103 is hatched in this example).

The display apparatus 100 in advance sends to the wireless communication apparatuses 101, 102, and 104 a grouping request message (M203 in FIG. 2) including information items (6) to (9) (112 in FIG. 1) required for grouping. The information includes:

(6) ESSID (group identification information): "SP_PDA-A"

(7) Channel to be used (wireless channel used by the group): ch1

(8) Operation mode (specifies that the current mode should be maintained): STA (9) Transmission power control (controls transmission capability after grouping): Power reduction Upon reception of the grouping request message (M203), each of the wireless communication apparatuses 101, 102, and 104 recognizes the message as occurrence of an event and the process of each of the wireless communication apparatuses proceeds from step S402 to S403 of FIG. 4, where the apparatuses 101, 102, 104 analyze the message. Because the event is a groping request message, the process proceeds to step S404 and it is determined the operation mode in item (8) listed above. Each of the wireless communication apparatuses 101, 102, and 104 recognizes that the specified operation mode is STA and the process proceeds from step S404 to step S405, where the apparatuses 101, 102, 104 disassociate from the display apparatus 100. Here, disassociation processing (M204 in FIG. 2) is performed. Then, the process of each of the wireless communication apparatuses 101, 102, and 104 proceeds to step S406 and it is determined whether disassociation processing (M204) with the display apparatus 100 has been completed. When completed, the process of each of the apparatuses 101, 102, 104 proceeds to step S407. In step S407, the wireless communication apparatuses 101, 102, 104 uses the ESSID in item (6) and channel information in item (7) indicating the wireless channel to be used in the message (message 112 (M203) in FIG. 1) to start a process to associate and authenticate (M205) with the wireless communication apparatus 103. On the other hand, with the knowledge of the ESSID in (6), the wireless communication apparatuses 101, 102, and 104 can identify the channel to be used (7) by scanning all channels. Therefore, the display apparatus 100 may send the grouping request message (M203 in FIG. 2) without including item (7).

Then the process of each of the wireless communication apparatuses 101, 102, 104 proceeds to step S408, it is determined whether the process to associate and authenticate (M205 in FIG. 2) with the wireless communication apparatus 103 has been completed. If it is determined that the process has been completed, the process of each of the wireless communication apparatuses 101, 102, 104 proceeds to step S409. In step S409, each of the wireless communication apparatuses 101, 102, and 104 controls transmission power to reduce the power according to the transmission power control information in item (9) contained in the grouping request message (M203). As a result, each of the wireless communication apparatuses 101 to 104 enters a power reduction mode (PW down) as shown in FIG. 2.

Thus, the control area 301 controlled by the wireless LAN to which the wireless communication apparatuses 101 to 104 belong is reduced to the control area 302 as shown in FIG. 3 by using the wireless information (items (6) to (9) listed above) contained in the grouping request message (M202 in FIG. 2).

FIG. 8 shows a view illustrating an example of a configuration resulting from iterations of the process (steps S401 to S415 in FIG. 4) described above performed between the display apparatus 100, which is the first AP, and wireless communication apparatuses 101 to 104, and any other wireless communication apparatuses. Here, areas 1301 to 1304 for multiple groups are created in a manner similar to that for the control area 302 for the group that uses wireless channel 1 (ch1). The display screen of the display apparatus 100 indicates that area 1302 includes wireless communication apparatuses 105 to 108 and that wireless communication apparatus 105 is operating in the AP mode. Similarly, for the control areas 1301 to 1304 for the other groups, the wireless communication apparatuses included in each group and the wireless communication apparatus operating in the AP mode in that group are identifiably displayed. Symbols I1301, I1303, and I1304 on the display screen denote the icons of control areas 1301, 1303, and 1304, respectively.

The first exemplary embodiment described above has the following effects:

(i) Because the wireless paths to the display apparatus (first AP) including the AP function can be controlled, congestion of access from multiple clients can be reduced. In addition, exhaustion of the available communication bandwidth within a Basic Service Set can be prevented.

(ii) From among clients displayed on the display screen of the display apparatus (first AP), a slave AP which arbitrates accesses and clients (STA) which are members of the group are designated. With the simple operation, clients can be readily grouped.

(iii) When groups are formed, a channel to be used is specified for each of neighboring groups. Therefore, channel interference between the groups can be avoided and the channels can be effectively used.

(iv) Because transmission power of the channel used by each group can be controlled after grouping, the transmission power can be reduced to avoid interference between neighboring groups, whereby channels can be effectively used.

Second Exemplary Embodiment

A second exemplary embodiment of the present invention will be described. A configuration and a control procedure of a wireless communication system according to the second exemplary embodiment will be described with reference to FIGS. 1, 3, 5, 6, 7 and 8. The wireless communication apparatuses and display apparatus according to the second exemplary embodiment have hardware configurations similar to that in the first exemplary embodiment and therefore the description of which will be omitted.

Figure 5:
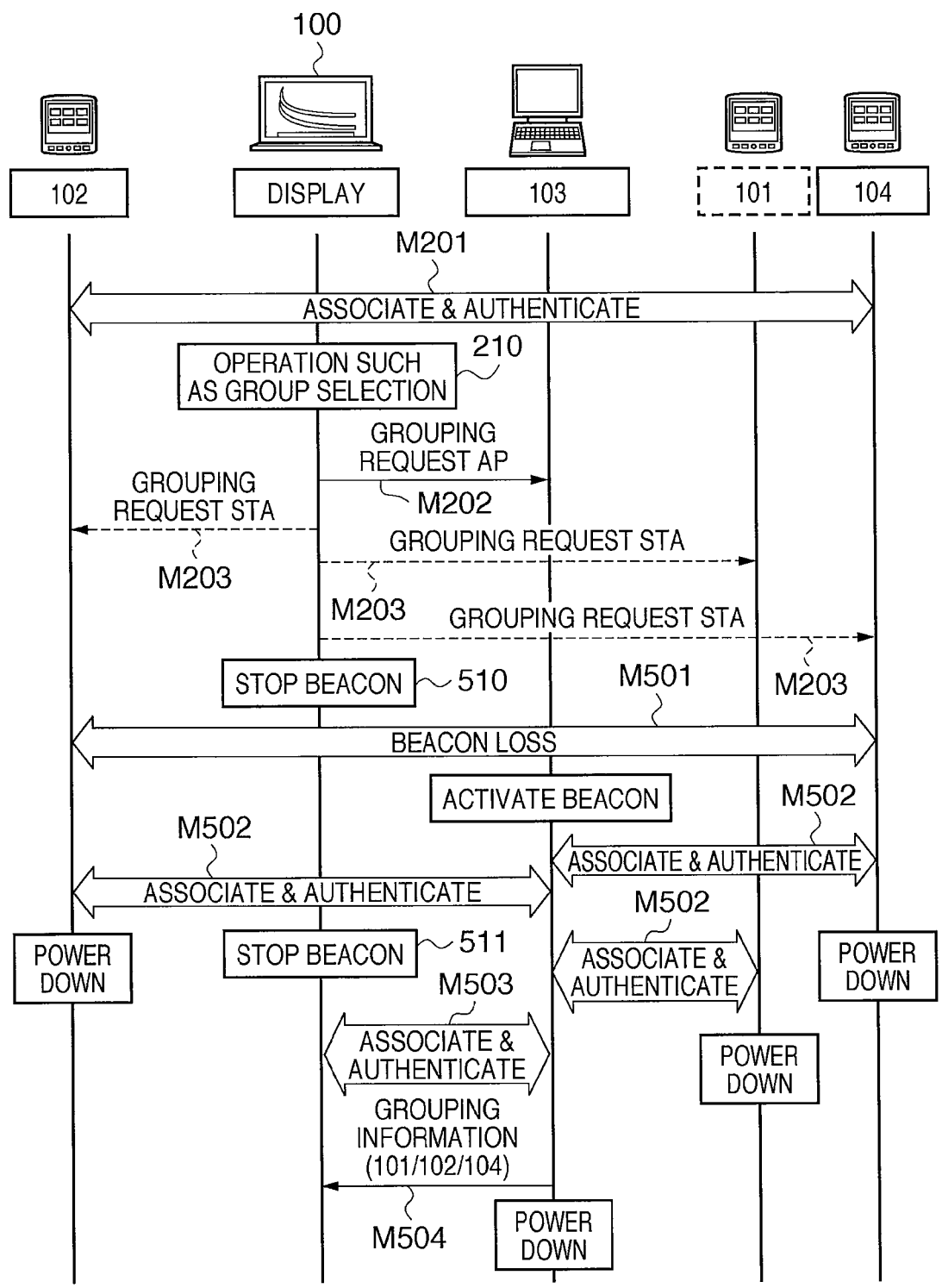
FIG. 5 is a sequence chart illustrating a process of sending and receiving messages among a display and wireless communication apparatuses constituting a wireless communication system according to a second exemplary embodiment of the present invention.

FIG. 5 is a sequence chart illustrating a process of sending and receiving messages among a display apparatus and wireless communication apparatuses constituting a wireless communication system according to the second exemplary embodiment of the present invention. The same elements in FIG. 5 as those in FIG. 2 are indicated by the same reference numerals and symbols.

Figure 6:
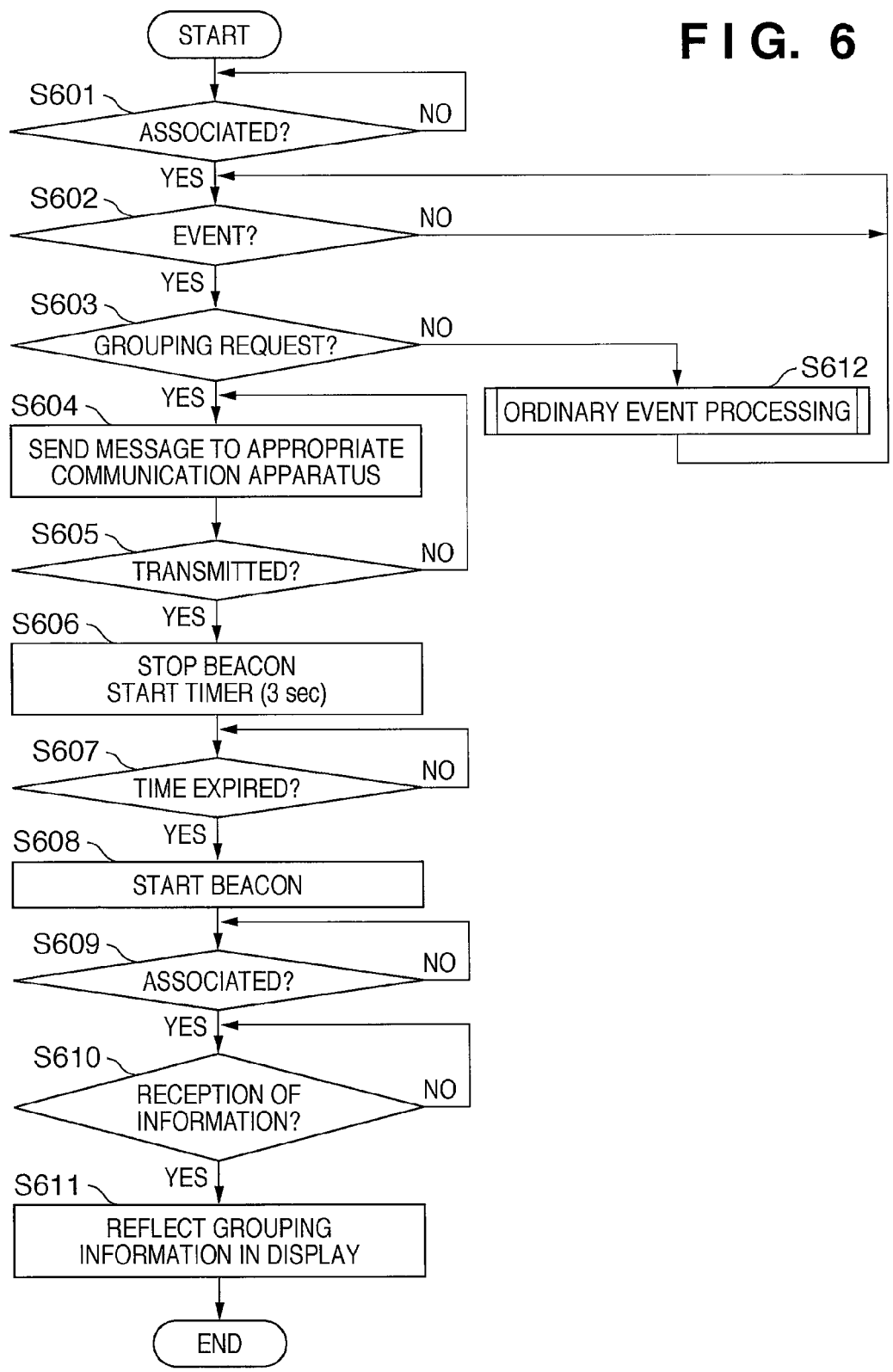
FIG. 6 is a flowchart explaining a control process performed by a display having a first AP function in the wireless communication system according to the second exemplary embodiment.

FIG. 6 is a flowchart explaining a control process performed by the display apparatus 100 of the wireless communication system according to the second exemplary embodiment which has a first AP function. A program that performs the process has been installed on the HDD 1804 beforehand. When the process is to be executed, the program is loaded into the RAM 1802 and is executed under the control of the CPU 1801.

Figure 7:
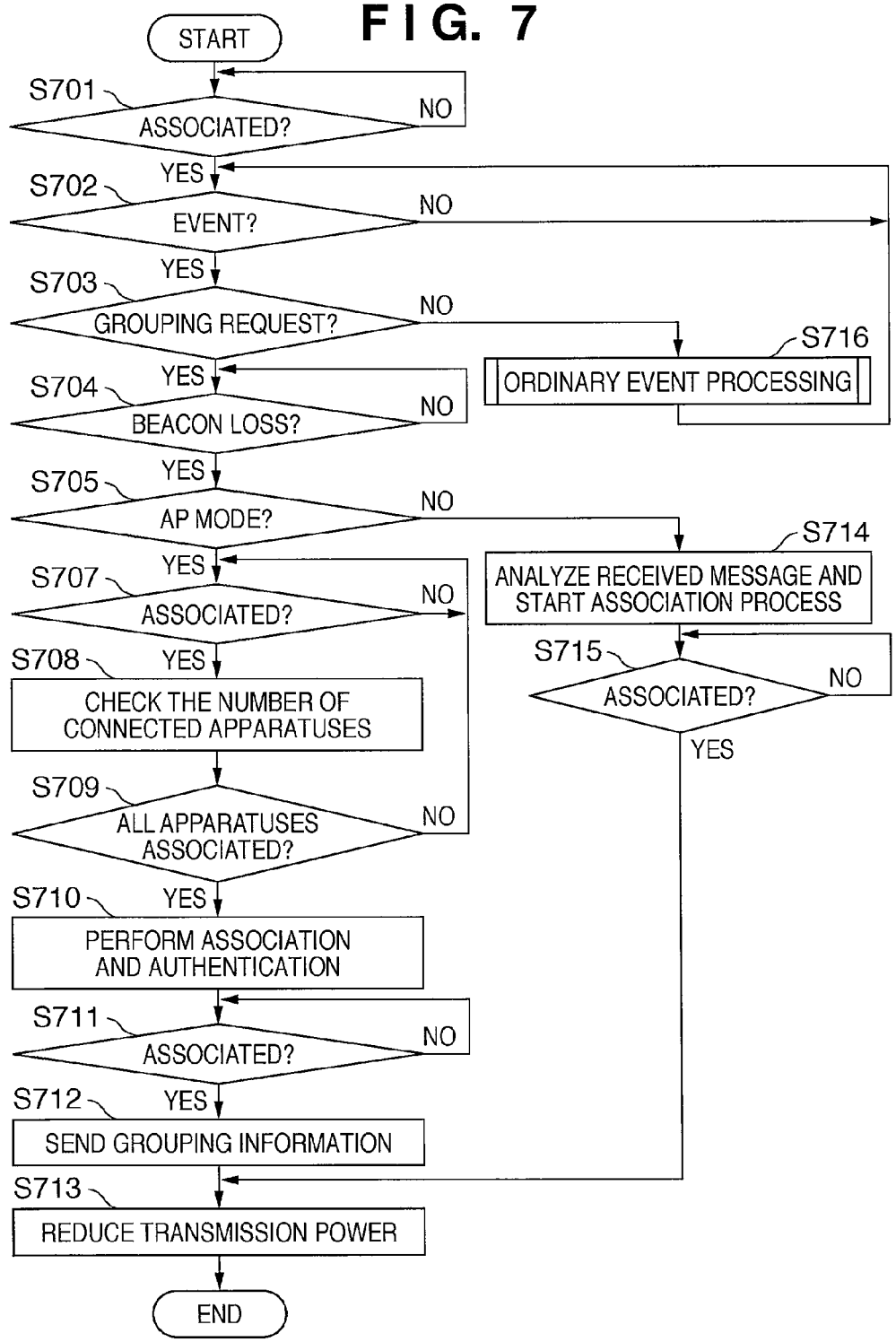
FIG. 7 is a flowchart explaining a control process performed by a wireless communication apparatus according to the second exemplary embodiment.

FIG. 7 is a flowchart explaining a control process performed in wireless communication apparatuses 101 to 108 according to the second exemplary embodiment. A program that performs the process has been installed on the HDD 1804 beforehand and, when the process is to be executed, the program is loaded into the RAM 1802 and is executed under the control of the CPU 1801.

In FIGS. 1 and 5, the display apparatus 100 having the AP function of wireless LAN has been associated and authenticated with wireless communication apparatuses 101 to 108 (at M201 in FIG. 5) which are operating in the STA mode.

Because the association and authentication have been completed in step S601 of FIG. 6, the process of the display apparatus 100 proceeds to step S602 and waits for occurrence of an event.

A user of the display apparatus 100 refers to the display screen of the display apparatus 100 and operates the console unit 1806 of the display apparatus 100 to instruct that the wireless communication apparatus 103 should be started in both STA and AP modes. The user also performs an operation for grouping wireless communication apparatuses 101 to 104 as in the first exemplary embodiment. In response to the operation, the display apparatus 100 recognizes that an event has occurred, and the process proceeds from step S602 to step S603. In step S603, the display apparatus 100 determines whether the event is a grouping request. If it is not a grouping request, the process of the display apparatus 100 proceeds to step S612 and performs ordinary event processing for the event.

If the display apparatus 100 determines in step S603 that the event is a grouping request, the process of the display apparatus 100 proceeds to step S604 and performs the following process. In step S604, the display apparatus 100 sends a grouping request message (M202 in FIG. 5) to the wireless communication apparatus 103, with the following item (10) to (13) of information (111 in FIG. 1) required for second grouping included:

(10) ESSID (group identification information): "SP_PDA-A"

(11) Channel to be used (wireless channel used by the group): ch1

(12) Operation mode (specifies a mode to be activated in addition to STA mode): AP

(13) The number of communication apparatuses in the group (excluding the wireless communication apparatus 103): 3

The display apparatus 100 also sends a grouping request message (M203 in FIG. 5) to the other wireless communication apparatuses 101, 102, and 104 (step S604), with the following item (14) and (15) of information required for the grouping included:

(14) ESSID (group identification information): "SP_PDA-A"

(15) Operation mode (specifies that the current mode should be maintained): STA

Information indicating the channel to be used is not sent because the wireless communication apparatuses 101, 102, and 104 can identify the wireless channel being used by the wireless communication apparatus 103 by scanning all channels on the basis of the ESSID in (14). If desired, information indicating the channel to be used may be sent in the grouping request message (M203 in FIG. 5) as in the first exemplary embodiment.

In step S605, the display apparatus 100 determines whether the grouping request messages (M202 and M203) have been sent to the wireless communication apparatuses. When the messages have been sent, the process of the display apparatus 100 proceeds to step S606. In step S606, the display apparatus 100 stops its beacon (510 in FIG. 5) and activates a beacon restart timer (for example a 3-second timer). The display apparatus 100 waits until the end of counting by the timer (a lapse of 3 seconds) in step S607 and then the process proceeds to step S608, where the display apparatus 100 resends the beacon (511 in FIG. 5). The process of the display apparatus 100 proceeds to step S609 and waits for association and authentication (M503 in FIG. 5) with the wireless communication apparatus 103. After completion of association and authentication with the wireless communication apparatus 103 in step S609, the process of the display apparatus proceeds to step S610 and waits for grouping information (M504 in FIG. 5) from the wireless communication apparatus 103. Upon reception of the grouping information, the process proceeds to step S611, where the display apparatus 100 displays the result of grouping on the display screen on the basis of the information (see FIG. 8).

Processing by the display apparatus 100 having the AP function in the wireless LAN has been described above.

Operation of wireless communication apparatuses 101, 102, and 104 that received the grouping request message (M203 in FIG. 5) including information items (10) to (13) (112 in FIG. 1) required for second grouping will be described next with reference to FIGS. 1, 5, and 7. Here, the wireless communication apparatuses 101, 102, and 104 are operating in the STA mode. A process performed by each of the wireless communication apparatuses 101, 102, and 104 after a beacon loss (M501 in FIG. 5) due to beacon stop processing by the display apparatus 100 will be described.

When association and authentication have completed in step S701, the process of each of the wireless communication apparatuses 101, 102, and 104 proceeds to step S702 and waits for occurrence of an event. Upon reception of a grouping request message (M203 in FIG. 5) from the display apparatus 100, each of the wireless communication apparatus 101, 102, 104 recognizes it as occurrence of an event and the process proceeds to step S703, where each of the wireless communication apparatuses analyzes the message of the event. In step S703, it is determined whether the event is reception of a grouping request message and whether the message is a grouping request. If the event is not a grouping request, the process of each of the wireless communication apparatuses 101, 102, 104 proceeds to step S716, where each of the apparatuses performs ordinary processing of the non-message-reception event.

On the other hand, if the event in step S703 is the grouping request message, the process of each of the wireless communication apparatuses 101, 102, 104 proceeds to step S704 and it is determined whether or not a beacon from the display apparatus 100 is in a beacon loss state (M501 in FIG. 5). If it is determined in the beacon loss state (M501 in FIG. 5) in step S704, the process of each of the wireless communication apparatuses 101, 102, 104 proceeds to step S705 and it is determined whether the operation mode contained in the grouping request message (M203). In this case, because the operation mode in wireless information (item (15) listed above) in the grouping request message (M203) is STA, the process of each of the wireless communication apparatus 101, 102, 104 proceeds to step S714. In step S714, the wireless communication apparatuses 101, 102, 104 uses the wireless information (item (14) listed above) in the message (M203) to start the association and authentication process (M502 in FIG. 5) with the wireless communication apparatus 103. The wireless communication apparatus 101, 102, 104 waits for completion of the association and authentication process (M502) with the wireless communication apparatus 103 in step S715 and then the process proceeds from step S715 to step S713. In step S713, the wireless communication apparatuses 101, 102, 104 find that the wireless information (items (14) and (15) listed above) does not contain information about a channel to be used, and therefore reduce the transmission power. As a result, each of the wireless communication apparatuses 101, 102, and 104 enters a power reduction mode (PW down).

Thus, the control area 301 (FIG. 3) of the wireless LAN to which the wireless communication apparatuses 101 to 104 belong is reduced to the control area 302 as shown in FIGS. 3 and 8 by using the wireless information (items (14) and (15) listed above) contained in the grouping request message (M203).

Operation of the wireless communication apparatuses 101, 102, and 104 that are operating in the STA mode has been described above with reference to FIGS. 1 and 5.

Operation of the wireless communication apparatus 103 that has received the grouping request message (M202) including the information items (10) to (13) (111 in FIG. 1) required for the second grouping will be described next with reference to FIGS. 1, 5, and 7.

Upon reception of the grouping request message (M202) from the display apparatus 100, the process of the wireless communication apparatus 103 proceeds from step S702 to step S703 and then to step S704. In step S704, the wireless communication apparatus 103 performs a process of checking for a beacon from the display apparatus 100, determines that it is in a beacon loss state (M501 in FIG. 5), and the process proceeds to step S705. In step S705, the wireless communication apparatus 103 determines the operation mode in the wireless information (item (12) listed above) contained in the grouping request message (M202 in FIG. 5). Here, the wireless communication apparatus 103 determines that the operation mode is the AP mode and the process proceeds to step S706, where the wireless communication apparatus 103 activates the AP mode based on the information in items (10) and (11) contained in the grouping request message (M202 in FIG. 5). Then, the process of the wireless communication apparatus 103 proceeds to step S707 and, based on the quantity information indicating the number of apparatuses in item (13) listed above, enters a wait state in which it waits for association with each of the wireless communication apparatuses 101, 102, and 104. After the association and authentication (M502 in FIG. 5), the process of the wireless communication apparatus 103 proceeds to step S708, where the wireless communication apparatus 103 determines the number of wireless communication apparatuses with which the wireless communication apparatus 103 has performed association and authentication. It is determined in step S709 whether the number is equal to the number in item (13) listed above. When it is determined in step S709 that the process for wireless communication apparatuses as many as the number in item (13) has been completed, the process of the wireless communication apparatus 103 proceeds to step S710. In step s710, the wireless communication apparatus 103 starts an association and authentication process (M503 in FIG. 5) in order to establish association with the display apparatus 100 in the STA mode. When the association and authentication process (M503) with the display apparatus 100 have been completed in step S711, the process of the wireless communication apparatus 103 proceeds to step S712. In step S712, the wireless communication apparatus 103 sends grouping information (M504 in FIG. 5) including information concerning the grouped wireless communication apparatuses 101, 102, and 104 to the display apparatus 100. The process then proceeds to step S713 and detects a reduction in reception signal strength (detects a reduction in transmission power) of data sent from the wireless communication apparatuses 101, 102, and 104. The wireless communication apparatus 103 controls its transmission power to be reduced in accordance with the result of detection of the transmission power. As a result, the control area of the wireless communication is reduced as indicated by numeral 302 in FIG. 8, as described above.

The process performed by the wireless communication apparatus 103 in FIGS. 1 and 5 functioning as an AP of a second group different from the display apparatus 100 which is the first AP has been described above.

Operation of the display apparatus 100 which is the first AP that has entered a wait state in which it waits for association with the wireless communication apparatus 103 (step S609) in FIG. 5 will be described next with reference to the flowchart of FIG. 6.

After completion of the process for association with the wireless communication apparatus 103 (M503), the process of the display apparatus 100 proceeds from step S609 to step S610 and enters a grouping information (M504) wait state. Upon reception of the grouping information (M504) from the wireless communication apparatus 103, the process of the display apparatus 100 proceeds to step S611 and analyzes the grouping information. As a result of the analysis, the display apparatus 100 groups the icons of the wireless communication apparatuses in the group and changes its display as shown in the exemplary display of the display apparatus 100 in FIGS. 3 and 8.

Again, the process described with reference to FIGS. 6 and 7 is repeated between the display apparatus 100 acting as the first AP and the wireless communication apparatuses 101 to 104 and any other wireless communication apparatuses as shown in FIG. 8. As a result, control areas 1301 to 1304 associated with multiple groups are generated as with the control area 302 that uses wireless channel 1 (ch1). The control areas for the groups are displayed on the screen in a simple manner as shown on the display apparatus 100.

The second exemplary embodiment described above has the following effects:

(i) Because the wireless paths to the display apparatus (first AP) having the AP function can be controlled, congestion of access from multiple clients can be reduced. In addition, exhaustion of the available communication bandwidth within a Basic Service Set can be prevented.

(ii) Clients can be readily grouped simply by specifying a slave AP that arbitrates access and clients (STA) which are members of the group from among clients displayed on the screen of the display apparatus (first AP).

(iii) When groups are formed, a channel to be used is specified for each of neighboring groups. Therefore, channel interference between the groups can be avoided and the channels can be effectively used.

(iv) Because transmission power of the channel used by each group can be reduced after grouping, interference between neighboring groups can be avoided, whereby the channels can be effectively used.

Third Exemplary Embodiment

A control procedure by a wireless communication system according to a third exemplary embodiment of the present invention will be described with reference to FIGS. 9 to 11. The hardware configuration of wireless communication apparatus and a display apparatus according to the third exemplary embodiment is the same as that in the first exemplary embodiment described above and therefore the description of which will be omitted.

Figure 9:
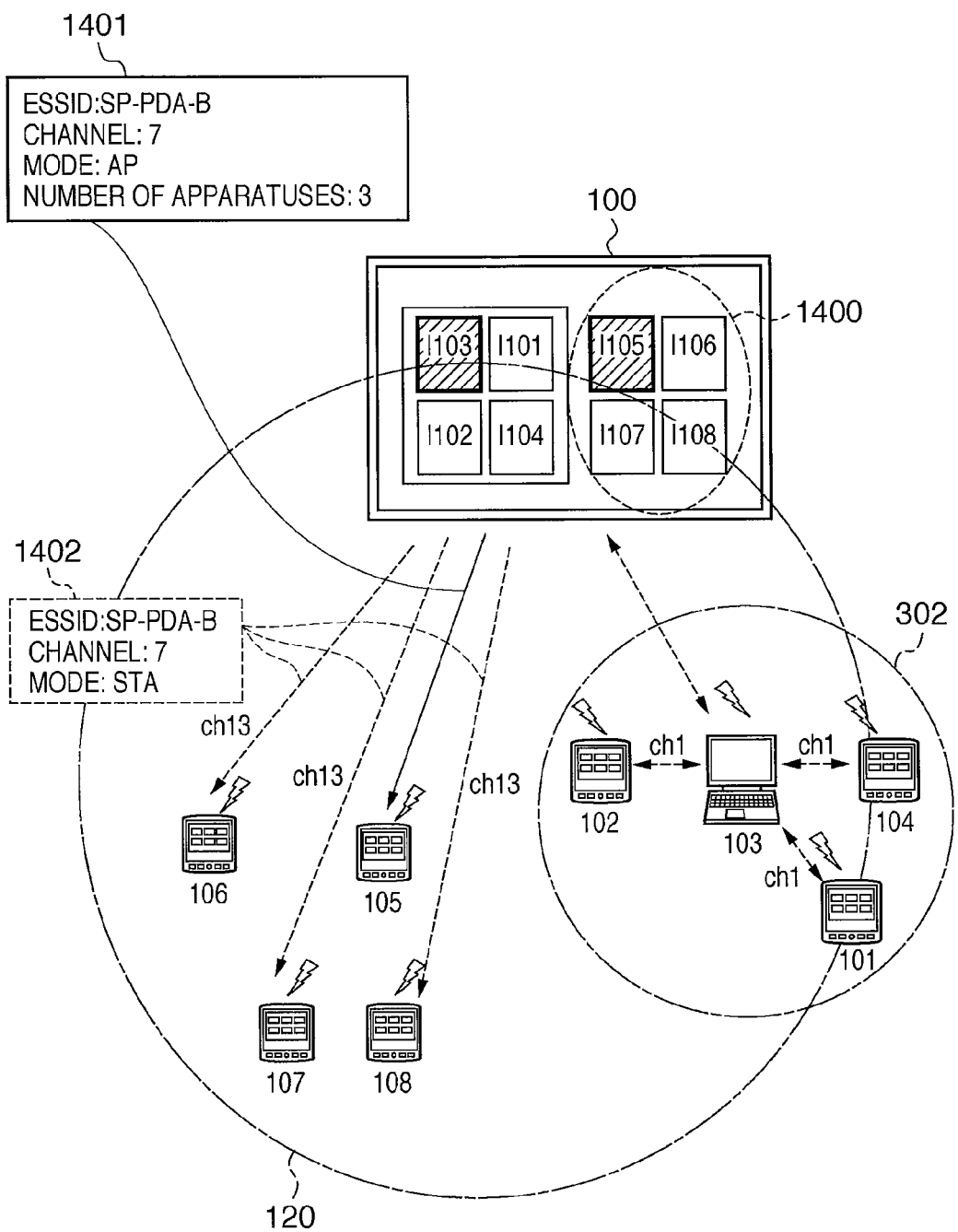
FIG. 9 depicts a view illustrating an example of a network configuration of a wireless communication system according to a third exemplary embodiment of the present invention.

FIG. 9 depicts a view illustrating an example of a network configuration of the wireless communication system according to the third exemplary embodiment of the present invention.

Reference numeral 1400 denotes a group of icons of wireless communication terminals selected in grouping. Reference numeral 1401 denotes a message to a wireless communication apparatus to be activated in the AP mode. Reference numeral 1402 denotes messages to wireless communication apparatuses to be activated in the STA mode.

In FIG. 9, the control area 302 formed by wireless communication apparatuses 101 to 104 is a second wireless control area formed by a second group that differs from the control area 120 managed by a display apparatus 100.

The description of the third exemplary embodiment will be started with description of a state before the transmission power control step described in the first and second exemplary embodiments is started in the control area 302. The steps before the control area 302 is established are the same as those detailed with respect to the exemplary embodiments, except for implementations, and therefore the description of those steps will be omitted. Only differences from the exemplary embodiments described above will be described below.

The display apparatus 100 having the AP function of wireless LAN has completed association and authentication with wireless communication apparatuses 105 to 108 which are operating in the STA mode in control area 120. A user of the display apparatus 100 refers to the display screen on the display apparatus 100 and instructs that the wireless communication apparatus 105 should be activated in both the STA and AP modes, similarly to the processes described with respect to the first and second exemplary embodiments. The user also performs an operation on the display apparatus 100 for grouping the wireless communication apparatuses 105 to 108 into a group (1400 in FIG. 9).

The display apparatus 100 recognizes occurrence of the event caused by the user's operation. The display apparatus 100 determines that the event is a grouping request and sends a grouping request message to the wireless communication apparatus 105, with the following items of information (a) to (d) (1401 in FIG. 9) required for the second grouping included:

(a) SSID (group identification information): "SP_PDA-B"

(b) Channel to be used (wireless channel used by the group): ch7

(c) Operation mode (specifies a mode to be activated in addition to STA mode): AP (d) The number of the communication apparatuses in the group (excluding the wireless communication apparatus 105): 3

Unlike the grouping request message of the first exemplary embodiment, the grouping request message sent here does not include transmission power control (item (5) listed earlier). Then, the display apparatus 100 sends a grouping request message to the other wireless communication apparatuses 106 to 108, including the following information items (e) to (g) (1402 in FIG. 9) required for the grouping.

(e) ESSID (group identification information): "SP_PDA-B"

(f) Channel to be used (wireless channel used by the group): ch7

(g) Operation mode (specifies that the current mode should be maintained): STA

Unlike the grouping request message of the first exemplary embodiment, the grouping request message sent here does not contain transmission power control (item (10) listed earlier).

The process relating to the grouping after the grouping request messages including the information are sent by the display apparatus 100 to the respective wireless communication apparatuses 105 to 108 is the same as that in the first or second exemplary embodiment described above and therefore the description of which will be omitted.

FIG. 10 depicts a view illustrating an example of a configuration of the wireless communication system following the configuration in FIG. 9 in the third exemplary embodiment.

The display screen of the display apparatus 100 having the first AP function displays the state of the system after the areas 302 and 1501 for the groups have been established. Reference numeral 1501 denotes a control area established with a wireless channel (ch7) different from that for the control area 302 (ch1). In this way, a third control area 1501 that differs from the control area 120 of the display apparatus 100 and the control area 302 of the wireless communication apparatus 103 is formed by the wireless communication apparatuses 105 to 108. Because the grouping request messages sent do not contain transmission power control (item (5) listed earlier) in the third exemplary embodiment, the communication control area is not reduced, unlike the exemplary embodiments described above.

Upon completion of association with the wireless communication apparatus 105, the display apparatus 100 enters a grouping information wait state. Upon reception of grouping information from the wireless communication apparatus 105, the display apparatus 100 analyzes the grouping information. Then the display apparatus 100 displays the icons of the wireless communication apparatuses that are grouped based on the result at the analysis as shown in the exemplary display of the display apparatus 100 shown in FIG. 10. Then, the display apparatus 100 which is the first AP, the wireless communication apparatuses 101 to 108 and any other wireless communication apparatuses use information indicating different wireless channels (channel 4 or 10) in the system to repeat the process described above (see FIGS. 9 and 10).

Figure 11:
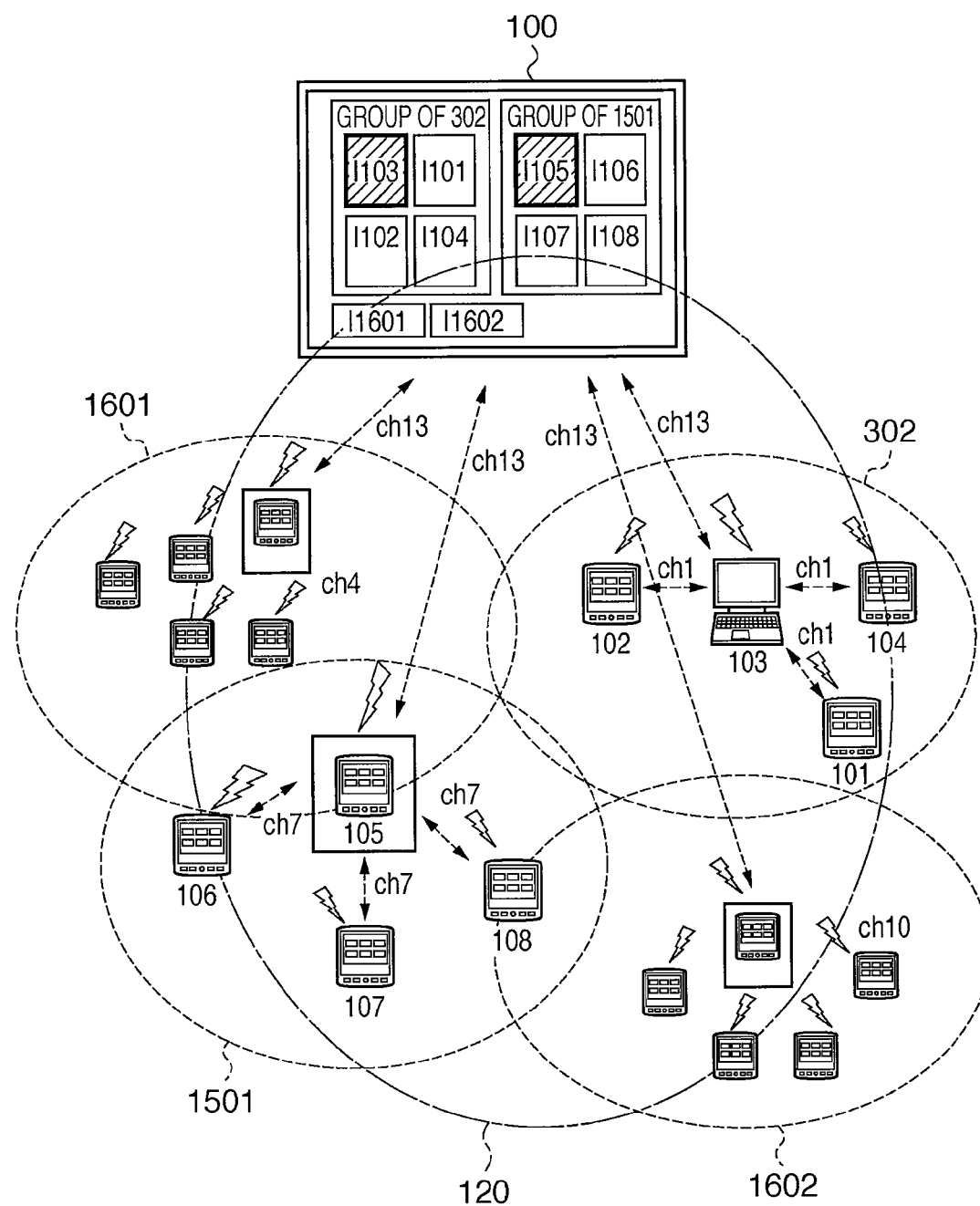
FIG. 11 depicts a view illustrating an example of a network configuration of the wireless communication system following the configuration in FIG. 10 according to the third exemplary embodiment.

FIG. 11 depicts a view illustrating an example of a network configuration of the wireless communication system according to the third exemplary embodiment after further grouping following the grouping in FIG. 10.

The state of the system after groups associated with control areas 302, 1501, 1601, and 1602 have been established is displayed on the display screen of the display apparatus 100 having the first AP function. Control area 1601 is established with a wireless channel (for example channel 4 (ch4)) different from those for control areas 302 (channel 1 (ch1)) and 1501 (channel 7 (ch7)). Control area 1602 is established with another wireless channel (for example channel 10 (ch10)).

In FIG. 11, the control area 1601 that uses wireless channel 4 and the control area 1602 that uses wireless channel 10 are created under the management of the control area 120, similarly to the control areas 302 and 1501.

The control areas of the groups that use different wireless channels are displayed in a simple way as shown on the screen of the display apparatus 100 in FIG. 11. Symbols I1601 and I1602 in FIG. 11 denote the icons of the control areas 1601 and 1602, respectively.

Variation of the third exemplary embodiment A variation of the third exemplary embodiment of the present invention will be described with reference to FIG. 12. In the first and second exemplary embodiments described above, multiple groups with control areas that differ from that of the display apparatus 100 that is the first AP, control the transmission power to use the same wireless channel (channel 1). In the third exemplary embodiment, multiple groups with their respective control areas that differ from that of the display apparatus 100 which is the first AP, use different wireless channels (channels 1, 4, 7, and 10).

Figure 12:
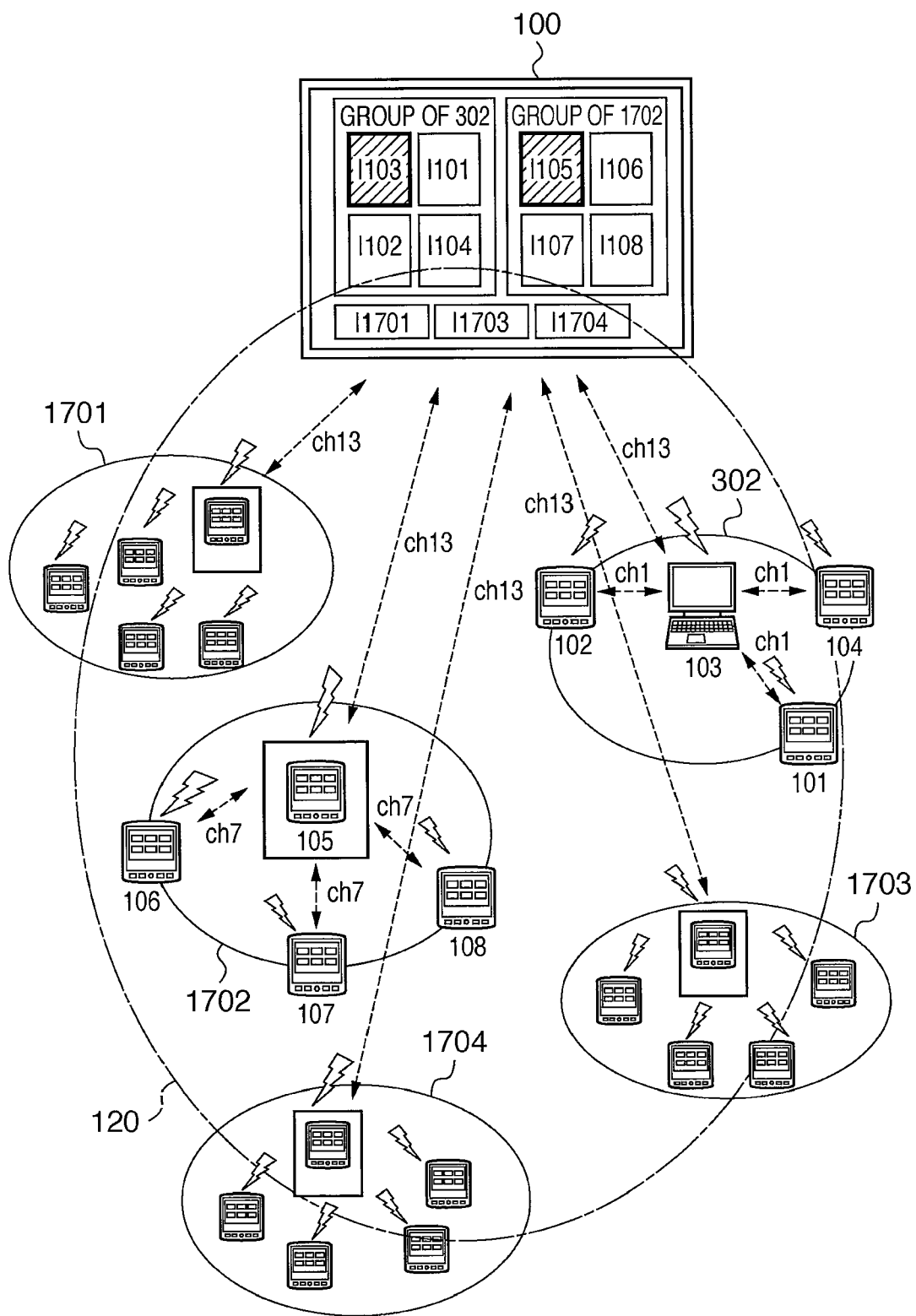
FIG. 12 depicts a view illustrating an example of a network configuration of a wireless communication system according to a variation of the third exemplary embodiment.

FIG. 12 shows a view illustrating an example of a network configuration of a wireless communication system according to a variation of the third exemplary embodiment.

Like the display in FIG. 1, the screen of the display apparatus 100 having the first AP function displays a state of the system after multiple groups represented by the control areas 302 and 1701 to 1704 have been established. Control areas 1701 and 1704 are established with the same wireless channel (ch1) as that of the control area 302 (channel 1). The control areas 1702 and 1703 are established with a wireless channel (ch7). Here, the wireless communication apparatuses have reduced their transmission power. Reference symbols I1701, I1703, and I1704 denote the icons of the control areas 1701, 1703, and 1704, respectively.

In the variation, multiple groups control their transmission power to form different control areas and use different wireless channels (channels 1 (ch1), 7 (ch7) and so on).

The third exemplary embodiment described above has the following effects:

(i) Because the wireless paths to the display apparatus (first AP) including the AP function can be controlled, congestion of access from multiple clients can be reduced. In addition, exhaustion of the available communication bandwidth within a Basic Service Set can be prevented.

(ii) Clients can be readily grouped simply by specifying a slave AP that arbitrates access and clients (STA) which are members of the group from among clients displayed on the display screen of the display apparatus (first AP).

(iii) When groups are formed, a channel to be used is specified for each of neighboring groups. Therefore, channel interference between the groups can be avoided and the channels can be effectively used.

(iv) Because transmission power of the channel used by each group can be reduced after grouping, interference between neighboring groups can be avoided and the channels can be effectively used.

Fourth Exemplary Embodiment

A control procedure of a wireless communication system according to a fourth exemplary embodiment of the present invention will be described with reference to FIGS. 13 to 16. Wireless communication apparatuses and a display apparatus according to the fourth exemplary embodiment have hardware configurations similar to that in the first exemplary embodiment described earlier.

Figure 13:
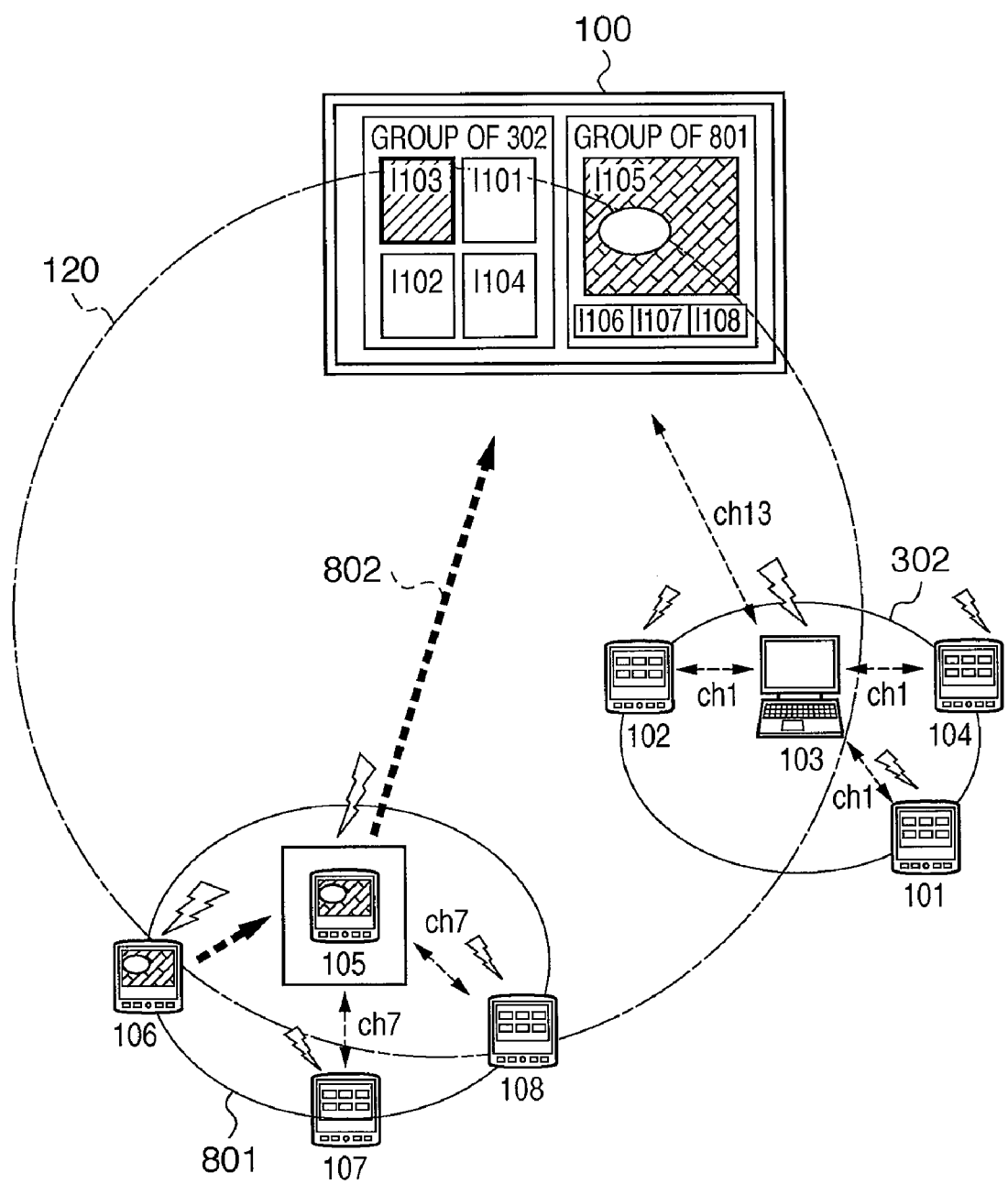
FIG. 13 depicts a view illustrating an example of a network configuration of a wireless communication system according to a fourth exemplary embodiment of the present invention.

FIG. 13 shows a view illustrating an example of a network configuration of the wireless communication system according to the fourth exemplary embodiment of the present invention.

A state of the system after multiple groups associated with control areas 302 and 801 have been formed is displayed on the screen of the display apparatus 100 having the first AP function. In particular, in the control area 801, a wireless communication apparatus 106 is sending moving picture data to the display 100 through a wireless communication apparatus 105 that is operating in the AP mode in the control area 801 after the grouping.

Figure 14:
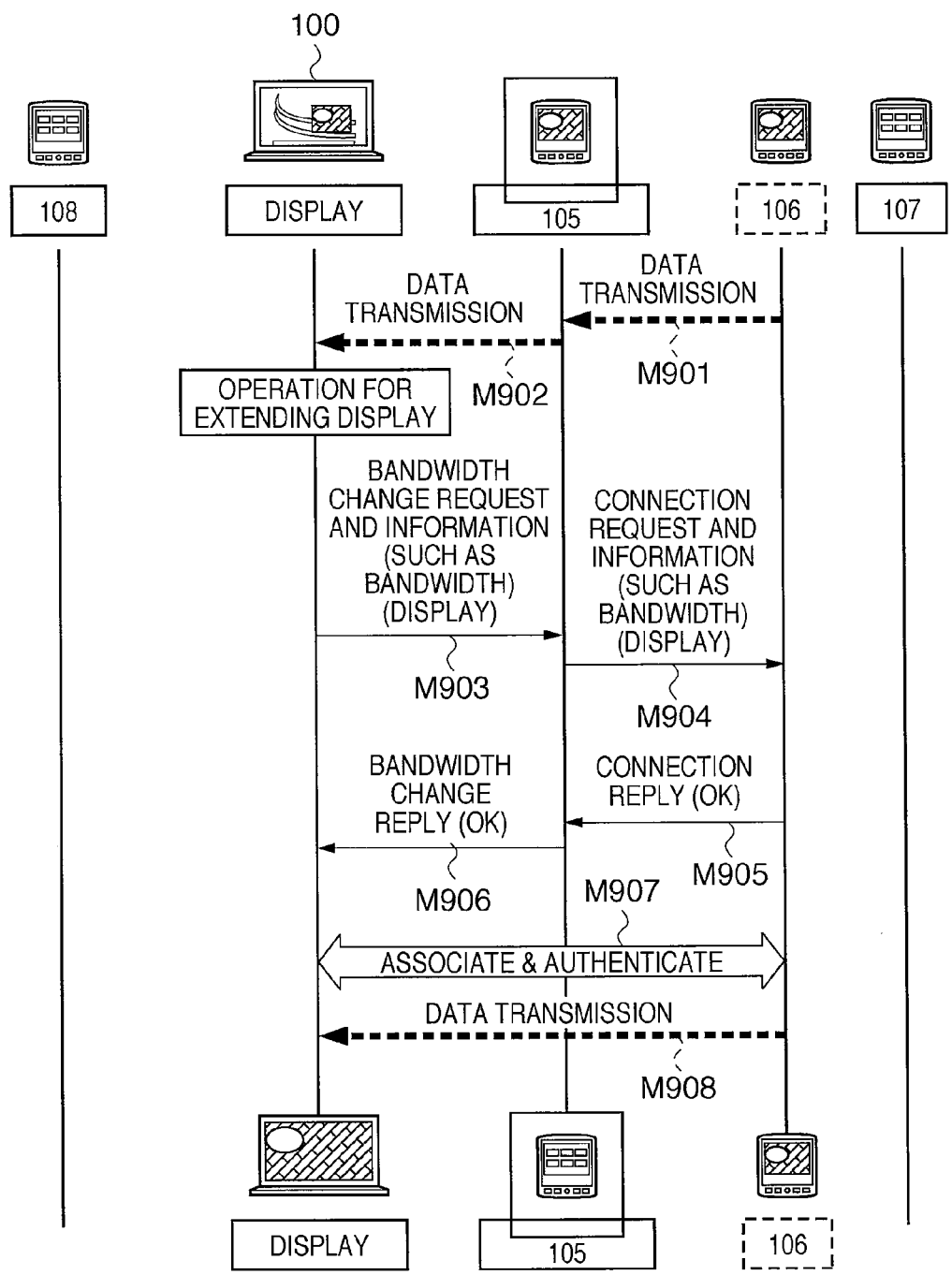
FIG. 14 is a sequence chart illustrating a process of sending and receiving messages among a display and wireless communication apparatuses constituting the wireless communication system according to the fourth exemplary embodiment.

FIG. 14 is a sequence chart illustrating a process of sending and receiving messages among the display apparatus and wireless communication apparatuses constituting the wireless communication system according to the fourth exemplary embodiment of the present invention. The wireless communication apparatuses and display apparatus according to the fourth exemplary embodiment have a hardware configuration similar to that in the first exemplary embodiment and therefore the description of which will be omitted.

Figure 15:
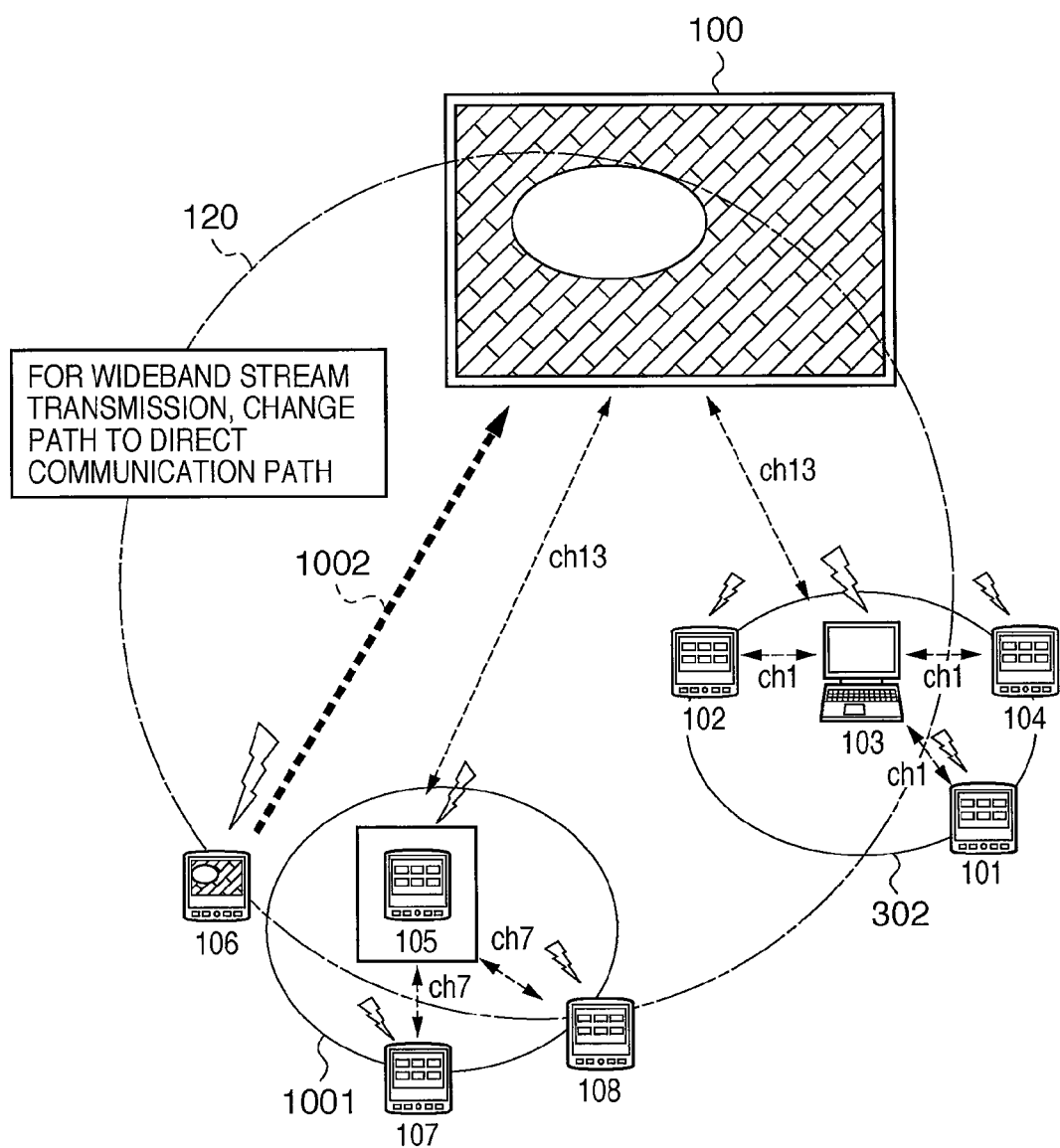
FIG. 15 depicts a view illustrating an example of a network configuration of the wireless communication system according to the fourth exemplary embodiment.

FIG. 15 shows a view illustrating an example of a network configuration of the wireless communication system according to the fourth exemplary embodiment.

The screen of the display apparatus 100 having the first AP function like the display apparatus in FIG. 1 is displaying moving picture data directly transmitted from a wireless communication apparatus 106. In FIG. 15, the wireless communication apparatus 106 has pulled out of the control area 1001 of the wireless communication apparatus 105 operating in the AP mode and forms a new group and the wireless communication apparatuses 105, 107, and 108 have reduced the transmission power. Reference numeral 1002 denotes data transmission in which moving picture data is being directly transmitted from the wireless communication apparatus 106 to the display apparatus 100 with an increased bandwidth.

Figure 16:
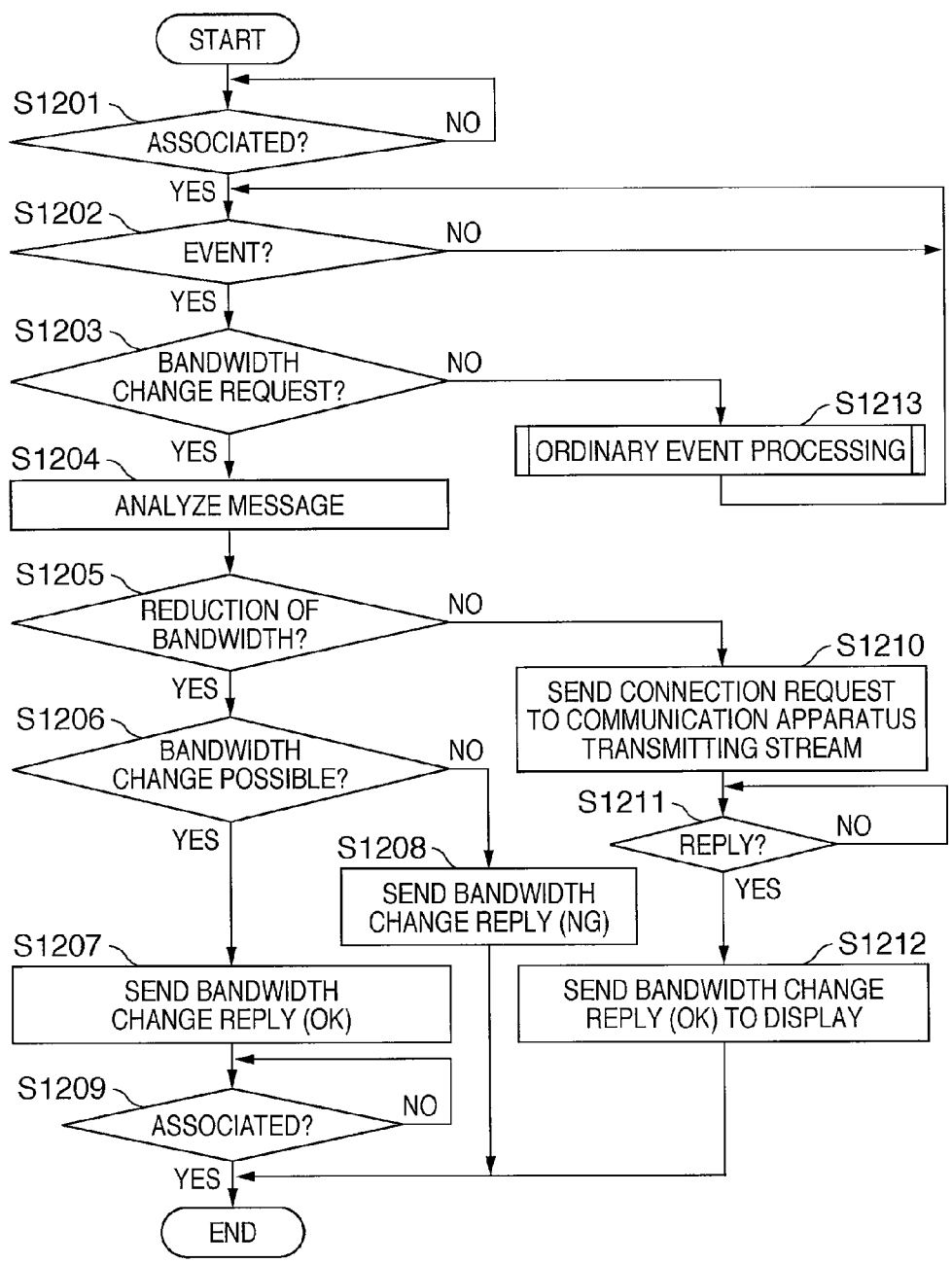
FIG. 16 is a flowchart explaining a control process performed by a wireless communication apparatus activated in AP mode according to the fourth and other exemplary embodiments.

FIG. 16 is a flowchart explaining a control process performed by the wireless communication apparatus 105 operating in the AP mode according to the fourth and other exemplary embodiments. A program that performs the process has been installed on an HDD 1804. When the program is to be executed, the program is loaded into a RAM 1802 and executed under the control of a CPU 1801.

In FIG. 13, the wireless communication apparatus 105 that is operating in the STA mode has been associated and authenticated with the display apparatus 100 having the AP function of wireless LAN. The wireless communication apparatus 105 has been activated in the AP mode and has been associated and authenticated with the wireless communication apparatuses 106, 107, and 108 in the group that forms control area 801. Accordingly, in the flowchart of FIG. 16, the wireless communication apparatus 105 passes through step S1201 and waits for an event in step S1202. The state of the system after groups with the control areas 302 and 801 have been formed is displayed on the screen of the display apparatus 100 in FIG. 13.

In the control area 801, after the group is formed, the wireless communication apparatus 106 transmits moving picture data (M901 and M902 in FIG. 14) to the display apparatus 100 through the wireless communication apparatus 105 operating in the AP mode (802 in FIG. 13). A user of the display apparatus 100 performs an operation for extending the image of moving picture data (M901 and M902) being transmitted from the wireless communication apparatus 106. In this case, display apparatus 100 sends a bandwidth change request (bandwidth control) message (M903 in FIG. 14) to the wireless communication apparatus 105.

The wireless communication apparatus 105 receives the bandwidth change request massage (M903 in FIG. 14) including an ESSID (group identification information) and bandwidth information from the display apparatus 100 and recognizes the reception of the message as occurrence of an event. Accordingly, the process of the wireless communication apparatus 105 proceeds from step S1202 to step S1203 in FIG. 16 and analyzes the message. In step S1203, the wireless communication apparatus 105 determines whether the wireless communication apparatus 105 has received a bandwidth change request message. If not, the process of the wireless communication apparatus 105 proceeds to step S1213, where wireless communication apparatus 105 performs processing for the event that occurred, then returns to step S1202.

If the wireless communication apparatus 105 determined in step S1203 that the event is reception of a bandwidth change request message (M903), the process proceeds to step S1204 and analyzes the message. The wireless communication apparatus 105 determines in step S1205 whether the bandwidth should be increased or decreased, based on the result of the analysis. If the bandwidth should be increased, the process proceeds to step S1210 and sends a connection request message including the ESSID (group identification information) of the display apparatus 100 and bandwidth information (M904 in FIG. 14) to the wireless communication apparatus 106. Thus, the wireless communication apparatus 106 receives the connection request message (M904). The wireless communication apparatus 106 determines whether the bandwidth can be changed. If the bandwidth can be changed, the wireless communication apparatus 106 returns a connection reply message (M905 in FIG. 14) including identification information (such as the MAC address) of the wireless communication apparatus 106 to the wireless communication apparatus 105. The wireless communication apparatus 106 also performs an association and authentication process (M907 in FIG. 14) with the display apparatus 100 based on the ESSID (group identification information) included in the connection request (M904).

Upon reception of the reply from the wireless communication apparatus 106, the process of the wireless communication apparatus 105 proceeds from step S1211 to step S1212. The wireless communication apparatus 105 then sends a bandwidth change reply message (M906 in FIG. 14) including the information in the connection reply message sent from the wireless communication apparatus 106 to the display apparatus 100.

After association and authentication between the wireless communication apparatus 106 and the display apparatus 100 are completed, the wireless communication apparatus 106 starts directly transmitting the moving picture data (M908 in FIG. 14) to the display apparatus 100 (1002 in FIG. 15).

Furthermore, the display of the moving picture data (M908) on the screen of the display apparatus 100 before the display extend operation is extended as shown on the display apparatus 100 in FIG. 15 after the display extend operation.

As the wireless communication apparatus 106 directly communicates with the display apparatus 100, the control area 801 (FIG. 13) controlled by the wireless communication apparatus 105 in the AP mode is changed to the control area 1001 shown in FIG. 15 in response to the display extend operation.

In this way, when an instruction to extend the display screen on the display apparatus 100 is issued, the wireless communication apparatus 106 that is supplying image data to the display apparatus 100 through the wireless communication apparatus 105 that is a second access point apparatus is directly connected to the display apparatus 100. Therefore, an increase in the amount of image data due to an increase of bandwidth can be accommodated without increasing the load on the second access point apparatus.

Variation of the fourth exemplary embodiment

A control procedure by a wireless communication system according to a variation of the fourth exemplary embodiment of the present invention will be described below with reference to FIGS. 13 and 15 to 17.

The fourth exemplary embodiment has been described with respect to a case where the display of moving picture data is extended in response to a user operation on the display apparatus 100. The embodiment can also be applied to a case where the display of moving picture data is to be reduced in the present invention. The process for displaying a reduced display will be described below in detail.

Figure 17:
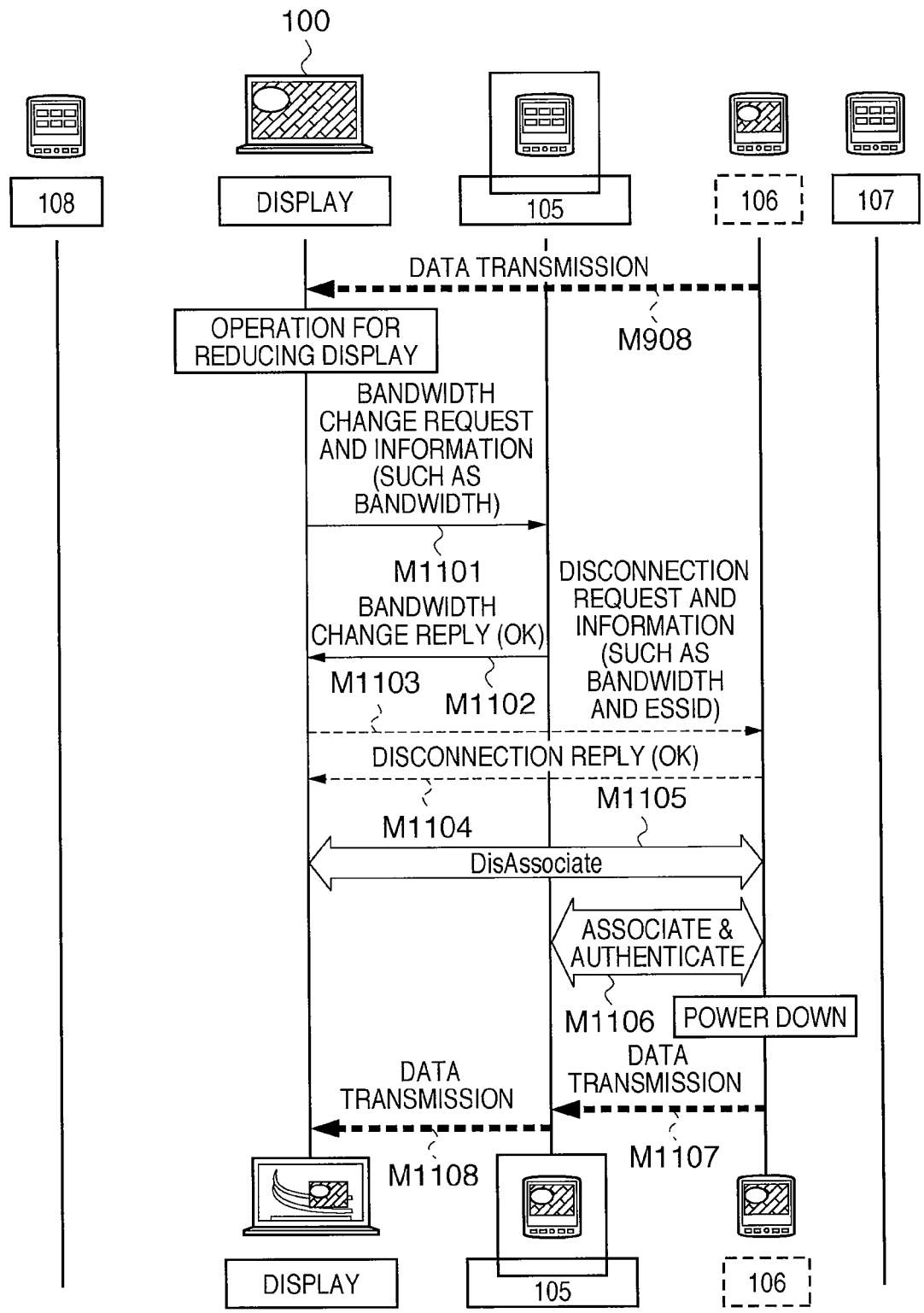
FIG. 17 is a sequence chart illustrating a process of sending and receiving messages among a display and wireless communication apparatuses constituting a wireless communication system according to a variation of the fourth exemplary embodiment.

FIG. 17 is a sequence chart illustrating a process of sending and receiving messages among a display apparatus and wireless communication apparatuses constituting a wireless communication system according to the variation of the fourth exemplary embodiment.

As in the exemplary embodiments described above, a wireless communication apparatus 105 in FIG. 17 which is operating in the STA mode has been associated and authenticated with a display apparatus 100 having the AP function of wireless LAN. The wireless communication apparatus 105 has been activated in the AP mode and association and authentication between the wireless communication apparatus 105 and the wireless communication apparatuses 107 and 108 have been completed (the process in FIG. 16 has proceeded from step S1201 to step S1202). Moving picture data (M908) sent from the wireless communication apparatus 106 is being displayed on the screen of the display apparatus 100. Here, a user of the display apparatus 100 performs an operation for reducing the size of the image of the moving picture data (M908) being displayed.

As a result, a bandwidth change request message (M1101 in FIG. 17) is sent from the display apparatus 100 to the wireless communication apparatus 105 by which the wireless communication apparatus 106 has been controlled and managed. The bandwidth change request message (M1101) contains terminal identification information (for example the MAC address) of the wireless communication apparatus 106 and bandwidth information. Upon reception of the bandwidth change request message (M1101), the wireless communication apparatus 105 recognizes it as occurrence of an event and the process of the wireless communication apparatus 105 proceeds from step S1202 to step S1203, where the wireless communication apparatus 105 analyzes the message. When the wireless communication apparatus 105 determines that the event is a bandwidth change request message (M1101), the process proceeds from step S1203 to step S1204 and analyzes the message. When the wireless communication apparatus 105 determines in step S1205 that the message is a bandwidth reduction request message on the basis of the analysis, the process of the wireless communication apparatus 105 proceeds to step S1206, where the wireless communication apparatus 105 determines whether the bandwidth change is possible. If the wireless communication apparatus 105 determines that the change is impossible, the process proceeds to step S1208 and sends back a bandwidth change reply (NG) message to the display apparatus 100.

On the other hand if the wireless communication apparatus 105 determines in step S1206 that the change is possible, the process proceeds to step S1207 and sends back a bandwidth change reply (OK) message (M1102 in FIG. 17) to the display apparatus 100. Then, the process of the wireless communication apparatus 105 proceeds to step S1209 and enters an association wait state for performing association and authentication with the wireless communication apparatus 106.

On the other hand, if the display apparatus 100 receives the bandwidth change reply (NG) message, the display apparatus 100 displays a message indicating that image cannot be reduced on the display screen and will end the process. If the display apparatus 100 receives the bandwidth change reply (OK) message (M1102), the display apparatus 100 sends a disconnection request message (M1103) including the ESSID (group identification information) of the wireless communication apparatus 105 and bandwidth information to the wireless communication apparatus 106. Upon reception of the disconnection request message (M1103), the wireless communication apparatus 106 sends back a disconnection reply message (M1104) including identification information (for example the MAC address) of the wireless communication apparatus 106 to the display apparatus 100. The wireless communication apparatus 106 then performs a disassociation process (M1105 in FIG. 17), which is a disconnection process, with the display apparatus 100. Then the wireless communication apparatus 106 performs association and authentication (M1106) with the wireless communication apparatus 105. After completion of the association and authentication, the process of the wireless communication apparatus 106 passes through step S1209 of FIG. 16 and will end the process.

On the other hand, the wireless communication apparatus 106 reduces the transmission power and transmits the moving picture data (M1107) directly to the display apparatus 100.

As a result, the display of the moving picture data (M1108) on the display apparatus 100 before the screen display reduction operation is reduced as shown on the screen of the display apparatus 100 in FIG. 13 after the screen display reduction operation. In addition, the state of the system after multiple groups with control areas 302 and 801 are formed is displayed on the screen of the display apparatus 100 in FIG. 13.

In the group with the control area 801, the wireless communication apparatus 106 transmits moving picture data (M901, M902) to the display apparatus 100 through the wireless communication apparatus 105 operating in the AP mode (802 in FIG. 13). As the wireless communication apparatus 106 returns to the control area 1001 in FIG. 15, the area controlled by the wireless communication apparatus 105 in the AP mode is changed to the control area 801 in FIG. 13 in response to the screen display reduction operation.

The fourth exemplary embodiment described above has the following effects:

(i) Because the wireless paths to the display apparatus (first AP) including the AP function can be controlled, congestion of access from multiple clients can be reduced. In addition, exhaustion of the available communication bandwidth within a Basic Service Set can be prevented.

(ii) Clients can be readily grouped simply by specifying a slave AP that arbitrates access and clients (STA) which are members of the group from among clients displayed on the screen of the display apparatus (first AP).

(iii) When groups are formed, a channel to be used is specified for each of neighboring groups. Therefore, channel interference between the groups can be avoided and the channels can be effectively used.

(iv) Because transmission power of the channel used by each group can be reduced after grouping, interference between neighboring groups can be avoided and the channels can be effectively used.

(v) Switching can be made between direct transmission from a wireless communication apparatus to the display apparatus (first AP) and transmission passing through the AP (second AP) of the group, according to a change of transmission bandwidth.

Other Embodiments

Exemplary embodiments of the present invention have been described above in detail.

The present invention can also be implemented by providing a software program that implements functions of any of the exemplary embodiments described above directly or remotely to a system or an apparatus, whereby the computer of the system or apparatus reads and executes the program provided. In that case, the software does not need to be a program. The software may be any software in any form that has functionality of a program.

Therefore, a program code installed on a computer in order to implement the functions and processing of the present invention by the computer also implements the present invention. That is, the claims of the present invention also include the computer program itself for implementing the functions and processing of the present invention. The program may be in any form that has functionality of a program, such as an object code, a program executed by an interpreter, or script data to be provided to an OS.

The recording medium for providing the program may be any of various types of media such as a floppy (registered trademark) disk, hard disk, optical disk, magneto-optical disk (MO), CD-ROM, CD-R, CD-RW, magnetic tape, non-volatile memory card, ROM, and DVD (DVD-ROM and DVD-R).

The program may also be provided to a client computer by connecting to a Web page on the Internet through a browser of the client computer and downloading the program to a recording medium such as a hard disk of the computer. In that case, the computer program of the present invention or a compressed file of the program of the present invention that includes an automatic install function may be downloaded. Furthermore, the program code constituting the program of the present invention may be divided into files and the individual files may be downloaded from different Web pages. That is, the claims of the present invention also include a WWW server that allows multiple users to download the program files for implementing the functions and processing of the present invention on computers.

Another implementation is possible in which the program of the present invention is encrypted, stored on storage media such as CD-ROMs, and distributed to users. In this case, users who meet predetermined conditions are allowed to download key information for decrypting the program from a Web page through the Internet, then the users use the key information to install the encrypted program on computers in executable form.

The present invention also can be implemented in a form other than the form in which the functions of the exemplary embodiments described are implemented by a computer reading and executing the program. For example, an OS running on a computer may perform part or all of actual processing in accordance with instructions of the program and the processing can implement the functions of any of the exemplary embodiments described above.

Furthermore, the program read from a recording medium may be written in a memory provided in a function extension board inserted in a computer or a function extension unit attached to a computer. In this case, a CPU or other processor provided in the function extension board or unit can perform part or all of actual processing in accordance with instructions of the program and the processing can implement the functions of any of the exemplary embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-271780, filed Oct. 18, 2007, which is hereby incorporated by reference herein in its entirety.

What is claimed is:

1. A wireless communication system including a plurality of wireless communication apparatuses supporting an access point mode and a station mode and a first access point apparatus of a first group including multiple wireless communication apparatuses, the system comprising:

a unit configured to cause the first access point apparatus to select one of the plurality of wireless communication apparatuses and activate the selected wireless communication apparatus as a second access point apparatus of a second group;

a unit configured to establish the second group including the second access point apparatus and multiple wireless communication apparatuses by the second access point apparatus; and a transmission power control unit configured to control the transmission power of the second access point apparatus and the multiple wireless communication apparatuses included in the second group after the second group is established, wherein the first access point apparatus comprises:
a transmission unit configured to transmit a message to the multiple wireless communication apparatuses constituting the second group,
wherein the message comprises at least one of identification information identifying the second group and medium information used in the second group.

2. The system according to claim 1, wherein the medium information comprises wireless channel information used in the second group.

3. The system according to claim 2, wherein said transmission power control unit comprises:
a unit configured to control the transmission power of the second access point apparatus in accordance with the medium information; and
a unit configured to control the transmission power of a wireless communication apparatus in the station mode included in the second group.

4. The system according to claim 1, wherein the first access point apparatus comprises a stopping unit configured to stop issuing a beacon after the message is transmitted,
wherein the multiple wireless communication apparatuses in the second group form the second group, in response to detecting that the beacon is stopped by said stopping unit.

5. The system according to claim 4, wherein after the second group is established, a plurality of wireless communication apparatuses included in the second group that are operating in the station mode control the transmission power of the plurality of wireless communication apparatuses in the second group, if the medium information does not include wireless channel information.

6. The system according to claim 5, wherein the second access point apparatus comprises a detection unit configured to detect a change in transmission power between the second access point apparatus and a plurality of wireless communication apparatuses being operating in the station mode after the second group is established,
wherein the second access point apparatus controls the transmission power of the plurality of wireless communication apparatuses being operating in the station mode in accordance with the result of detection by said detection unit.

7. A wireless communication system including a plurality of wireless communication apparatuses supporting an access point mode and a station mode and a first access point apparatus of a first group including multiple wireless communication apparatuses, the system comprising:
a unit configured to cause the first access point apparatus to select one of the plurality of wireless communication apparatuses and activate the selected wireless communication apparatus as a second access point apparatus of a second group;
a unit configured to establish the second group including the second access point apparatus and multiple wireless communication apparatuses by the second access point apparatus; and
a transmission power control unit configured to control the transmission power of the second access point apparatus and the multiple wireless communication apparatuses included in the second group after the second group is established, wherein the second access point apparatus comprises
a bandwidth control unit configured to control a wireless bandwidth for a plurality of wireless communication apparatuses included in the second group in accordance with an instruction concerning the wireless bandwidth for the first access point apparatus.

8. The system according to claim 5, wherein the first access point apparatus comprises:
a display unit configured to display information about a plurality of wireless communication apparatuses constituting the first group;
an access point designation unit configured to designate the second access point apparatus from the information about the wireless communication apparatuses displayed on said display unit; and
a grouping designation unit configured to designate the multiple wireless communication apparatuses constituting the second group.

9. A wireless communication apparatus comprising:
a reception unit configured to receive from a first access point apparatus a grouping request message including at least identification information of a wireless local area network, wireless channel information to be used in wireless communication, an operation mode, and quantity information indicating the number of apparatuses included in a group;
an establishment unit configured to communicate with as many wireless communication apparatuses as the number of apparatuses indicated by the quantity information through a wireless channel indicated by the wireless channel information to establish a group when the operation mode in the grouping request message received by said reception unit is an access point mode;
a notification unit configured to notify the first access point apparatus of the establishment of the group by said establishment unit; and
a transmission power control unit configured to control the transmission power of a plurality of wireless communication apparatuses included in the group in accordance with the grouping request message.

10. The apparatus according to claim 9, further comprising:
a disconnection unit configured to disconnect communication with the first access point apparatus when the operation mode in the grouping request message received by said reception unit is a station mode; and
a unit configured to establish the group by communicating with the wireless communication apparatus that is in the access point mode after the communication is disconnected by said disconnection unit.

11. A method for controlling a wireless communication apparatus, comprising the steps of:
receiving from a first access point apparatus a grouping request message including at least identification information of a wireless local area network, wireless channel information to be used in wireless communication, an operation mode, and quantity information indicating the number of apparatuses included in a group;
communicating with as many wireless communication apparatuses as the number of apparatuses indicated by the quantity information through a wireless channel indicated by the wireless channel information to establish a group, in a case that the operation mode in the grouping request message received in said receiving step is an access point mode;
notifying the first access point apparatus of the establishment of a group; and
controlling the transmission power of multiple wireless communication apparatuses included in the group in accordance with the grouping request message.

12. A method of controlling a wireless communication system including a plurality of wireless communication apparatuses supporting an access point mode and a station mode and a first access point apparatus of a first group including multiple wireless communication apparatuses, the method comprising:
   causing the first access point apparatus to select one of the plurality of wireless communication apparatuses and activating the selected wireless communication apparatus as a second access point apparatus of a second group;
   causing the second access point apparatus to establish the second group including the second access point apparatus and multiple wireless communication apparatuses; and
   controlling the transmission power of the second access point apparatus and the multiple wireless communication apparatuses included in the second group after the second group is established,
   transmitting, from the first access point apparatus, a message to the multiple wireless communication apparatuses constituting the second group,
      wherein the message comprises at least one of identification information identifying the second group and medium information used in the second group.

13. The method according to claim 12, wherein the medium information comprises wireless channel information used in the second group.

14. The method according to claim 13, wherein said controlling step comprises:
   controlling the transmission power of the second access point apparatus in accordance with the medium information; and
   controlling the transmission power of a wireless communication apparatus in the station mode included in the second group.

15. The method according to claim 12, further comprising:
   causing the first access point apparatus to stop issuing a beacon after the message is transmitted,
   wherein the multiple wireless communication apparatuses in the second group form the second group in response to detecting that the beacon is stopped.

16. The method according to claim 15, wherein after the second group is established, a plurality of wireless communication apparatuses included in the second group that are operating in the station mode control the transmission power of the plurality of wireless communication apparatuses in the second group, if the medium information does not include wireless channel information.

17. The method according to claim 16, further comprising:
   detecting, at the second access point apparatus, a change in transmission power between the second access point apparatus and a plurality of wireless communication apparatuses operating in the station mode after the second group is established, and
   wherein the controlling step comprises controlling, using the second access point apparatus, the transmission power of the plurality of wireless communication apparatuses operating in the station mode in accordance with the result of detection at the detecting step.

18. The method according to claim 15, further comprising:
   displaying information about a plurality of wireless communication apparatuses constituting the first group at a display unit of the first access point apparatus;
   designating the second access point apparatus from the information about the wireless communication apparatuses displayed in the display step; and
   designating the multiple wireless communication apparatuses constituting the second group.

19. A method for controlling a wireless communication system including a plurality of wireless communication apparatuses supporting an access point mode and a station mode and a first access point apparatus of a first group including multiple wireless communication apparatuses, the method comprising:
   causing the first access point apparatus to select one of the plurality of wireless communication apparatuses and activating the selected wireless communication apparatus as a second access point apparatus of a second group;
   causing the second access point apparatus to establish the second group including the second access point apparatus and multiple wireless communication apparatuses;
   controlling the transmission power of the second access point apparatus and the multiple wireless communication apparatuses included in the second group after the second group is established; and
   controlling, at the second access point apparatus, a wireless bandwidth for a plurality of wireless communication apparatuses included in the second group in accordance with an instruction concerning the wireless bandwidth for the first access point apparatus.

20. A non-transitory computer-readable storage medium storing a program which causes a computer to execute a method of controlling a wireless communication system including a plurality of wireless communication apparatuses supporting an access point mode and a station mode and a first access point apparatus of a first group including multiple wireless communication apparatuses, the method comprising:
   causing the first access point apparatus to select one of the plurality of wireless communication apparatuses and activating the selected wireless communication apparatus as a second access point apparatus of a second group;
   causing the second access point apparatus to establish the second group including the second access point apparatus and multiple wireless communication apparatuses; and
   controlling the transmission power of the second access point apparatus and the multiple wireless communication apparatuses included in the second group after the second group is established,
   transmitting, from the first access point apparatus, a message to the multiple wireless communication apparatuses constituting the second group,
   wherein the message comprises at least one of identification information identifying the second group and medium information used in the second group.

21. The non-transitory computer-readable storage medium according to claim 20, wherein the medium information comprises wireless channel information used in the second group.

22. The non-transitory computer-readable storage medium according to claim 21, wherein said controlling step comprises:
   controlling the transmission power of the second access point apparatus in accordance with the medium information; and
   controlling the transmission power of a wireless communication apparatus in the station mode included in the second group.

23. The non-transitory computer-readable storage medium according to claim 20, wherein the method further comprises:
   causing the first access point apparatus to stop issuing a beacon after the message is transmitted,
   wherein the multiple wireless communication apparatuses in the second group form the second group in response to detecting that the beacon is stopped.

24. The non-transitory computer-readable storage medium according to claim 23, wherein after the second group is established, a plurality of wireless communication apparatuses included in the second group that are operating in the station mode control the transmission power of the plurality of wireless communication apparatuses in the second group, if the medium information does not include wireless channel information.

25. The non-transitory computer-readable storage medium according to claim 24, wherein the method further comprises:
   detecting, at the second access point apparatus, a change in transmission power between the second access point apparatus and a plurality of wireless communication apparatuses operating in the station mode after the second group is established, and
   wherein the controlling step comprises controlling, using the second access point apparatus, the transmission power of the plurality of wireless communication apparatuses operating in the station mode in accordance with the result of detection at the detecting step.

26. The non-transitory computer-readable storage medium according to claim 24, wherein the method further comprises:
   displaying information about a plurality of wireless communication apparatuses constituting the first group at a display unit of the first access point apparatus;
   designating the second access point apparatus from the information about the wireless communication apparatuses displayed on said display unit; and
   designating the multiple wireless communication apparatuses constituting the second group.

27. A non-transitory computer-readable storage medium storing a program which causes a computer to execute a method for controlling a wireless communication system including a plurality of wireless communication apparatuses supporting an access point mode and a station mode and a first access point apparatus of a first group including multiple wireless communication apparatuses, the method comprising:
   causing the first access point apparatus to select one of the plurality of wireless communication apparatuses and activating the selected wireless communication apparatus as a second access point apparatus of a second group;
   causing the second access point apparatus to establish the second group including the second access point apparatus and multiple wireless communication apparatuses;
   controlling the transmission power of the second access point apparatus and the multiple wireless communication apparatuses included in the second group after the second group is established; and
   controlling, at the second access point apparatus, a wireless bandwidth for a plurality of wireless communication apparatuses included in the second group in accordance with an instruction concerning the wireless bandwidth for the first access point apparatus.

* * * * *